United States Patent
Hwang et al.

(10) Patent No.: US 9,467,871 B2
(45) Date of Patent: Oct. 11, 2016

(54) ITERATIVE COORDINATED BEAMFORMING SYSTEMS AND METHODS

(71) Applicant: QUALCOMM Incorporated, San Diego, CA (US)

(72) Inventors: Insoo Hwang, San Diego, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 13/790,085

(22) Filed: Mar. 8, 2013

(65) Prior Publication Data

US 2014/0094164 A1  Apr. 3, 2014

Related U.S. Application Data

(60) Provisional application No. 61/707,307, filed on Sep. 28, 2012.

(51) Int. Cl.

| | |
|---|---|
| H04W 4/00 | (2009.01) |
| H04W 36/00 | (2009.01) |
| H04W 16/28 | (2009.01) |
| H04B 7/02 | (2006.01) |
| H04B 7/08 | (2006.01) |
| H04B 7/06 | (2006.01) |

(52) U.S. Cl.
CPC ............. *H04W 16/28* (2013.01); *H04B 7/024* (2013.01); *H04B 7/0634* (2013.01); *H04B 7/0842* (2013.01); *H04B 7/0617* (2013.01); *H04B 7/0626* (2013.01); *H04B 7/0632* (2013.01); *H04B 7/0665* (2013.01)

(58) Field of Classification Search
CPC .......................................... H04W 16/00–16/32
See application file for complete search history.

(56) References Cited

U.S. PATENT DOCUMENTS

| | | | |
|---|---|---|---|
| 8,218,422 B2 | 7/2012 | Venturino et al. | |
| 2008/0076370 A1 | 3/2008 | Kotecha et al. | |
| 2009/0201903 A1* | 8/2009 | Ghady et al. | 370/342 |
| 2010/0173660 A1* | 7/2010 | Liu et al. | 455/501 |
| 2011/0070918 A1* | 3/2011 | Hafeez | H04B 7/0452 455/522 |
| 2011/0150132 A1* | 6/2011 | Kim et al. | 375/296 |

(Continued)

OTHER PUBLICATIONS

3GPP, 3rd Generation Partnership Project; Technical Specification Group Radio Access Network; Coordinated multi-point operation for LTE physical layer aspects (Release 11), 3GPP TR 36.819 V11.1.0 (Dec.-2011), 69 pgs.

(Continued)

*Primary Examiner* — San Htun
(74) *Attorney, Agent, or Firm* — Nerrie M. Zohn

(57) ABSTRACT

Methods in a multiple-cell cellular network that implements iterative coordinated beamforming (I-CBF) algorithms with limited cooperation from adjacent nodes (base stations and/or mobile stations) may jointly determine transmit beamforming vectors and receive combining vectors to increase sum throughput. The transmit beamforming vectors and receive combining vectors can be determined based on a performance metric, such as by maximizing SINR (signal-to-interference-and-noise ratio) for each mobile station in the network, maximizing SLNR (signal-to-leakage-and-noise ratio) for each base station in the network, or minimizing SMSE (sum mean square error). The algorithms may be performed to update vectors synchronously. In other cases, the algorithms may be performed to update vectors asynchronously.

37 Claims, 15 Drawing Sheets

(56) References Cited

U.S. PATENT DOCUMENTS

| | | |
|---|---|---|
| 2011/0159881 A1* | 6/2011 | Shin et al. .................... 455/450 |
| 2011/0211487 A1* | 9/2011 | Han ....................... H04B 7/024 370/252 |
| 2011/0237272 A1 | 9/2011 | Gorokhov et al. |
| 2011/0237282 A1 | 9/2011 | Geirhofer et al. |
| 2011/0268007 A1 | 11/2011 | Barany et al. |
| 2011/0275376 A1 | 11/2011 | Boldi et al. |
| 2012/0170676 A1 | 7/2012 | Tajer et al. |
| 2012/0289266 A1 | 11/2012 | Park et al. |
| 2012/0289275 A1 | 11/2012 | Li et al. |

OTHER PUBLICATIONS

Chae, et al., "Interference Aware-Coordinated Beamforming in a Multi-Cell System", IEEE Transactions on Wireless Communications, 2012, 12pgs.

Shen, et al., "MSE-Based Transceiver Designs for the MIMO Interference Channel", IEEE Transactions on Wireless Communications, vol. 9, No. 11, Nov. 2010, pp. 3480-3489.

International Search Report and Written Opinion—PCT/US2013/061456—ISA/EPO—May 5, 2014.

* cited by examiner

B800

A selected base station (BS) of a plurality of BSs requests a selected mobile station (MS) to measure a link quality of a wireless link between the selected MS and each BS of the plurality of BSs
— B810

The selected BS receives, from the selected MS, channel estimation information for a selected subset of wireless links that meet one or more specified criteria, the selected subset correponding to BSs interfering with the selected MS
— B820

The selected BS determines a transmit beamforming vector, based on the channel estimation information, for each of the interfering BSs
— B830

The selected BS transmits the transmit beamforming vector to each of the interfering BSs
— B840

The selected BS receives an updated transmit beamforming vector from one or more of the interfering BSs
— B850

Means for requesting a selected mobile station (MS) to measure a link quality of a wireless link between the selected MS and each BS of the plurality of BSs

B810'

Means for receiving from the selected MS, channel estimation information for a selected subset of wireless links that meet one or more specified criteria, the selected subset correponding to BSs interfering with the selected MS

B820'

Means for determining a transmit beamforming vector, based on the channel estimation information, for each of the interfering BSs

B830'

Means for transmitting the transmit beamforming vector to each of the interfering BSs

B840'

Means for receiving an updated transmit beamforming vector from one or more of the interfering BSs

A selected mobile station (MS) measures a link quality of a wireless link with each base station (BS) of a plurality of BSs, in response to a request from one of the BSs
⟶ B910

The selected MS selects a subset of the wireless links that includes links that meet one or more specified criteria
⟶ B920

The selected MS obtains channel estimation information for the wireless links of the selected subset
⟶ B930

The selected MS obtains a receive combining vector
⟶ B940

The selected MS applies the receive combining vector
⟶ B950

FIG. 9A

ITERATIVE COORDINATED BEAMFORMING SYSTEMS AND METHODS

CROSS-REFERENCE TO RELATED APPLICATIONS

This application claims priority from U.S. Provisional Application No. 61/707,307, filed Sep. 28, 2012, which is incorporated herein by reference in its entirety.

BACKGROUND

1. Field

The disclosure relates generally to the field of coordinated beamforming in multiple-antenna and multiple-cell networks, and, in particular, relates to systems and methods of iterative coordinated beamforming with limited cooperation in multiple-antenna and multiple-cell networks.

2. Background

Wireless cellular systems, e.g., 3GPP LTE-Advanced, implementing multiple antennas and multiple cells may use coordinated processing to provide high data rates and robustness to a user or mobile station (MS) located at the cell edge. In coordinated multicell processing, base stations cooperate to mitigate interference from adjacent cells and fading. If each base station (BS) and each MS is equipped with multiple antennas, beamforming/precoding can be used as a form of multicell cooperation, offering improved throughput compared to the traditional approaches of cellular network planning, such as frequency reuse, sectoring, or spread spectrum. The design of jointly optimized transmit and receive beamforming/precoding schemes, though, is a challenging task.

In coordinated beamforming (CBF), each MS receives a single stream of data from the serving BS, and cooperating BSs can coordinate to mitigate the other-cell interference. Multiple antennas at the MS further helps mitigating inter-cell interference, even with the use of a linear receive filter. Such a system model becomes more and more practical as the MS may see more cell edges due to the deployment of smaller cells in the next generation wireless cellular systems. Mitigating more diverse and stronger out-of-cell interference is the key to improve the performance of MSs located in the cell edge region.

For a K-user (K>1) interference channel with multiple antennas, network utility, such as (weighted) sum rate, is one of the most commonly considered performance measures. Under this objective, many algorithms are proposed for the purpose of the sum mean square error (MSE) minimization, minimum MSE (MMSE) interference alignment, max-min weighted SINR, (signal-to-interference-and-noise ratio) interference-aware coordinated beamforming, and iterative precoder optimization. Joint transmit/receive beamforming vector design to maximize the sum rate in K-user multiple-antenna multiple-cell networks is still an open problem requiring a lot more studies and innovations. In particular, the cost of cooperation is often neglected in most of the previously proposed algorithms.

SUMMARY

A method of coordinated beamforming performed at a central controller in a network having a plurality of mobile stations and a plurality of base stations includes, but is not limited to any one or combination of: (i) requesting, by the central controller, a selected mobile station (MS) to measure a link quality of a wireless link between the selected MS and each base station (BS) of the plurality of BSs; (ii) receiving, from the selected MS, channel estimation information for wireless links of a selected subset of the wireless links that meet one or more specified criteria; (iii) determining a transmit beamforming vector, for each BS associated with the wireless links of the selected subset, based on the channel estimation information; and (iv) transmitting the transmit beamforming vector to each BS associated with the wireless links of the selected subset.

In various embodiments, the determining a transmit beamforming vector, for each BS associated with the wireless links of the selected subset, based on the channel estimation information includes determining a transmit beamforming vector for each BS associated with the wireless links of the selected subset, based on the channel estimation information to maximize a signal-to-interference-and-noise ratio (SINR) for the selected MS.

In various embodiments, the determining a transmit beamforming vector, for each BS associated with the wireless links of the selected subset, based on the channel estimation information includes determining a transmit beamforming vector for each BS associated with the wireless links of the selected subset, based on the channel estimation information to maximize a signal-to-leakage-and-noise ratio (SLNR) for each BS associated with wireless links of the selected subset.

In various embodiments, the determining a transmit beamforming vector, for each BS associated with the wireless links of the selected subset, based on the channel estimation information includes determining a transmit beamforming vector for each BS associated with the wireless links of the selected subset, based on the channel estimation information to minimize sum mean square error (MSE).

In various embodiments, the central control is a base station of the plurality of base stations.

In various embodiments, the receiving, from the selected MS, channel estimation information for wireless links of a selected subset of the wireless links that meet one or more specified criteria includes measuring, by the selected MS, the link quality of the wireless link with each BS of the plurality of BSs; selecting, by the selected MS, a subset of the wireless links that includes wireless links that meet one or more specified criteria; and obtaining, by the selected MS, channel estimation information for the wireless links of the selected subset.

In some embodiments, the link quality of the wireless links is measured via handover (HO) measurement signaling.

In some embodiments, the link quality of the wireless links is measured via cell-specific reference signaling.

In various embodiments, the transmit beamforming vector is different for each BS associated with the wireless links of the selected subset.

In various embodiments, the method further including: determining a receive combining vector for each of the wireless links of the selected subset, based on the channel estimation information; and providing the receive combining vector to each MS of each BS associated with the wireless links of the selected subset.

In some embodiments, the providing the receive combining vector to each MS of each BS associated with the wireless links of the selected subset includes transmitting the receive combining vector to each BS associated with the wireless links of the selected subset; wherein each BS transmits the receive combining vector to the MS served by the BS.

In some embodiments, the providing the receive combining vector to each MS of each BS associated with the wireless links of the selected subset includes transmitting the receive combining vector to each MS of each BS associated with the wireless links of the selected subset.

In some embodiments, the receive combining vector is different for each MS of each BS associated with the wireless links of the selected subset.

In various embodiments, the method further includes providing a pilot for determining a receive combining vector to each MS of each BS associated with the wireless links of the selected subset.

In various embodiments, the one or more specified criteria is based on at least one of a signal-to-noise ratio, a target signal-to-interference-and-noise ratio, and a number of cooperating BSs.

An apparatus for coordinated beamforming at a central controller in a network having a plurality of mobile stations and a plurality of base stations may include but is not limited to any one or combination of: means for requesting a selected mobile station (MS) to measure a link quality of a wireless link between the selected MS and each base station (BS) of the plurality of BSs; means for receiving, from the selected MS, channel estimation information for wireless links of a selected subset of the wireless links that meet one or more specified criteria; means for determining a transmit beamforming vector, for each BS associated with the wireless links of the selected subset, based on the channel estimation information; and means for transmitting the transmit beamforming vector to each BS associated with the wireless links of the selected subset.

An apparatus for coordinated beamforming at a central controller in a network having a plurality of mobile stations and a plurality of base stations may include a processor configured for: requesting, a selected mobile station (MS) to measure a link quality of a wireless link between the selected MS and each base station (BS) of the plurality of BSs; receiving, from the selected MS, channel estimation information for wireless links of a selected subset of the wireless links that meet one or more specified criteria; determining a transmit beamforming vector, for each BS associated with the wireless links of the selected subset, based on the channel estimation information; and transmitting the transmit beamforming vector to each BS associated with the wireless links of the selected subset.

A computer program product for coordinated beamforming at a central controller in a network having a plurality of mobile stations and a plurality of base stations may include a non-transitory computer-readable medium comprising code for: requesting a selected mobile station (MS) to measure a link quality of a wireless link between the selected MS and each base station (BS) of the plurality of BSs; receiving, from the selected MS, channel estimation information for wireless links of a selected subset of the wireless links that meet one or more specified criteria; determining a transmit beamforming vector, for each BS associated with the wireless links of the selected subset, based on the channel estimation information; and transmitting the transmit beamforming vector to each BS associated with the wireless links of the selected subset.

A method of coordinated beamforming in a network having a plurality of mobile stations and a plurality of base stations may include but is not limited to any one or combination of: (i) requesting, by a selected base station (BS) of the plurality of BSs, a selected mobile station (MS) of the plurality of MSs to measure a link quality of a wireless link between the selected MS and each BS of the plurality of BSs; (ii) receiving, from the selected MS, channel estimation information for wireless links of a selected subset of the wireless links that meet one or more specified criteria, the selected subset corresponding to BSs interfering with the selected MS; (iii) determining a transmit beamforming vector, for each of the interfering BSs, based on the channel estimation information; and (iv) transmitting the transmit beamforming vector to each of the interfering BSs.

In various embodiments, the determining a transmit beamforming vector, for each of the interfering BSs, based on the channel estimation information includes determining a transmit beamforming vector, for each of the interfering BSs, based on the channel estimation information to maximize a signal-to-interference-and-noise ratio (SINR) for the selected MS.

In various embodiments, the determining a transmit beamforming vector, for each of the interfering BSs, based on the channel estimation information includes determining a transmit beamforming vector, for each of the interfering BSs, based on the channel estimation information to maximize a signal-to-leakage-and-noise ratio (SLNR) for each BS associated with wireless links of the selected subset.

In various embodiments, the determining a transmit beamforming vector, for each of the interfering BSs, based on the channel estimation information includes determining a transmit beamforming vector, for each of the interfering BSs, based on the channel estimation information to minimize sum mean square error (MSE).

In various embodiments, the receiving, from the selected MS, channel estimation information for wireless links of a selected subset of the wireless links that meet one or more specified criteria includes measuring, by the selected MS, the link quality of the wireless link with each BS of the plurality of BSs; selecting, by the selected MS, a subset of the wireless links that includes wireless links that meet one or more specified criteria; and obtaining, by the selected MS, channel estimation information for the wireless links of the selected subset.

In some embodiments, the link quality of the wireless links is measured via handover (HO) measurement signaling.

In some embodiments, the link quality of the wireless links is measured via cell-specific reference signaling.

In various embodiments, the method further includes: determining a receive combining vector based on the channel estimation information; and providing the receive combining vector to each MS of each BS associated with the wireless links of the selected subset.

In some embodiments, the providing the receive combining vector to each MS of each BS associated with the wireless links of the selected subset includes transmitting the receive combining vector to each BS associated with the wireless links of the selected subset. Each BS transmits the receive combining vector to the MS served by the BS.

In some embodiments, the providing the receive combining vector to each MS of each BS associated with the wireless links of the selected subset includes transmitting the receive combining vector to each MS of each BS associated with the wireless links of the selected subset.

In various embodiments, the method further including: providing a pilot for determining a receive combining vector to each MS of each BS associated with the wireless links of the selected subset.

In various embodiments, the one or more specified criteria is based on at least one of a signal-to-noise ratio, a target signal-to-interference-and-noise ratio, and a number of cooperating BSs.

In various embodiments, the method further including receiving an updated transmit beamforming vector from one or more of the interfering BSs.

In some embodiments, the method further including determining a new transmit beamforming vector, for each of the one or more of the interfering BSs, based on the updated transmit beamforming vector; and transmitting the new transmit beamforming vector to each of the one or more of the interfering BSs.

In various embodiments, the transmit beamforming vectors for the BSs are determined asynchronously.

An apparatus for coordinated beamforming in a network having a plurality of mobile stations and a plurality of base stations, the apparatus may include but is not limited to any one or combination of: means for requesting, by a selected base station (BS) of the plurality of BSs, a selected mobile station (MS) of the plurality of MSs to measure a link quality of a wireless link between the selected MS and each BS of the plurality of BSs; means for receiving, from the selected MS, channel estimation information for wireless links of a selected subset of the wireless links that meet one or more specified criteria, the selected subset corresponding to BSs interfering with the selected MS; means for determining a transmit beamforming vector, for each of the interfering BSs, based on the channel estimation information; and means for transmitting the transmit beamforming vector to each of the interfering BSs.

An apparatus for coordinated beamforming in a network having a plurality of mobile stations and a plurality of base stations may include a processor configured for: requesting, by a selected base station (BS) of the plurality of BSs, a selected mobile station (MS) of the plurality of MSs to measure a link quality of a wireless link between the selected MS and each BS of the plurality of BSs; receiving, from the selected MS, channel estimation information for wireless links of a selected subset of the wireless links that meet one or more specified criteria, the selected subset corresponding to BSs interfering with the selected MS; determining a transmit beamforming vector, for each of the interfering BSs, based on the channel estimation information; and transmitting the transmit beamforming vector to each of the interfering BSs.

A computer program product for coordinated beamforming in a network having a plurality of mobile stations and a plurality of base stations may include a non-transitory computer-readable medium comprising code for: requesting, by a selected base station (BS) of the plurality of BSs, a selected mobile station (MS) of the plurality of MSs to measure a link quality of a wireless link between the selected MS and each BS of the plurality of BSs; receiving, from the selected MS, channel estimation information for wireless links of a selected subset of the wireless links that meet one or more specified criteria, the selected subset corresponding to BSs interfering with the selected MS; determining a transmit beamforming vector, for each of the interfering BSs, based on the channel estimation information; and transmitting the transmit beamforming vector to each of the interfering BSs.

BRIEF DESCRIPTION OF THE DRAWINGS

FIG. 8A-8B are flowcharts of an iterative coordinated beamforming method according to various embodiments of the disclosure.

FIG. 9A-9B are flowcharts of a method performed by a mobile station according to various embodiments of the disclosure.

DETAILED DESCRIPTION

Various embodiments relate to a multiple-cell cellular network that implements iterative coordinated beamforming (I-CBF) algorithms with limited cooperation from adjacent nodes (base stations and/or mobile stations). In such a network, transmit beamforming vectors and receive combining vectors may be determined jointly to increase sum throughput. The transmit beamforming vectors and receive combining vectors can be determined based on a performance metric, such as by maximizing SINR (signal-to-interference-and-noise ratio) for each mobile station in the network, maximizing SLNR (signal-to-leakage-and-noise ratio) for each base station in the network, or minimizing SMSE (sum mean square error). In some embodiments, the algorithms may be performed to update vectors synchronously. In other embodiments, the algorithms may be performed to update vectors asynchronously.

Figure 1:
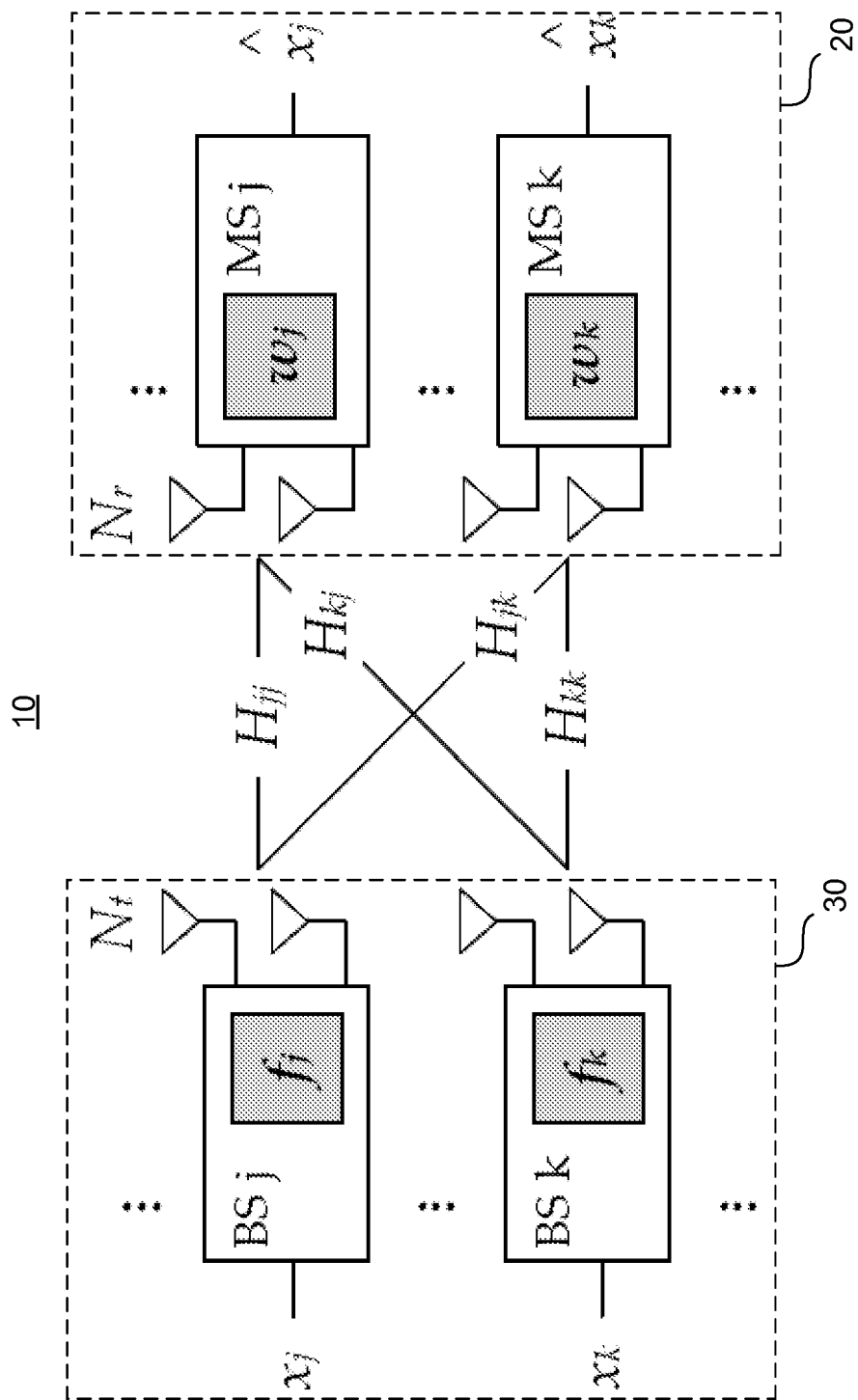
FIG. 1 illustrates a multiple-user, multiple-cell MIMO (multiple-input and multiple-output) system according to various embodiments of the disclosure.

FIG. 1 illustrates a model of network 10 that includes multiple mobile stations (e.g., 20 in FIG. 1) and multiple base stations (e.g., 30 in FIG. 1). A mobile station (MS) may also be referred to as a mobile device, a user, or a user equipment (UE). Each base station (BS) and each MS includes multiple antennas. That is, the network 10 is a K-user, K-cell MIMO (multiple-input and multiple-output) system (K>1) with $N_t$ transmit antenna and $N_r$ receiver antenna.

The network 10 may be configured to implement one or more multicell joint processing techniques. In particular embodiments, the network 10 is configured to implement coordinated beamforming (CBF). In CBF, each BS sends a stream of data to a MS served by the BS. As discussed in the disclosure, transmit beamforming vectors ($f_1, f_2, \ldots, f_k$) and receive combining vectors ($w_1, w_2, \ldots, w_k$) can be selected jointly among cooperating nodes (BSs and/or MSs) of the network 10 to maximize sum throughput ($\Re_{SUM}$) of the network. Multiple-Antenna, multiple-cell networks and processing techniques employed therein), for example, are disclosed in (but not limited to) Insoo Hwang et al., *Distributed Coordinated Beamforming with Limited Cooperation for Multi-Antenna Multicell Networks* (Submitted Fall 2012; to be published Summer 2013), which is herein incorporated by reference in its entirety.

At k-th BS, a normalized transmit symbol $x_k$ drawn from a constellation set is multiplied by the normalized beamforming vector $f_k \in \mathbb{C}^{N_t \times 1}$ and then transmitted over the $N_r \times N_t$ channel $H_{kk}$. A matrix $H_{jk}$ of size $N_r \times N_t$ is used to denote the interference from the j-th BS to the k-th MS.

According to various embodiments, each BS uses the same fixed power P/K, where P is the total transmit power used in the system. This equal power approach achieves performance close to that of a brute force search algorithm, for instance, as discussed in the disclosure.

The received signal at the k-th MS is given by $$y_k = \sqrt{\frac{P}{K}} H_{kk} f_k x_k + \sum_{j \neq h} \sqrt{\frac{P}{K}} H_{jk} f_j x_j + n_k. \quad (1)$$

where $n_k$ is an $N_r \times 1$ additive white Gaussian noise with variance $\sigma_k^2$ per entry. After applying a linear receive filter $w_k$ of size $N_r \times 1$, the estimated signal at the k-th MS is given by $\tilde{x}_k = w_k^x y_k$, where $w^*_k$ is Hermitian of $w_k$. The corresponding post-processing SINR at the k-th MS is $$\gamma k = \frac{\frac{P}{K}|w_k^* H_{kk} f_k|^2}{\sum_{j \neq k} \frac{P}{K}|w_k^* H_{jk} f_j|^2 + \|w_k\|_2^2 \sigma_2^2}, \quad (2)$$

and the achievable sum rate of all K MSs is given by $$\mathcal{R}_{SUM} = \sum_{k=1}^{K} \log_2(1 + \gamma k). \quad (3)$$

According to various embodiments, I-CBF algorithms may be based on the three different objectives (performance metrics): Max-SINR, Max-SLNR (signal-to-leakage-and-noise ratio) and Min-SMSE (sum MSE). Based on the objectives, the optimal beamforming vectors can also be obtained differently.

Maximizing per-MS SINR can be seen as a partial cooperation technique because each transceiver pair maximizes the pair's own link quality using the transmit beamforming vector(s) at other BS(s). With given receive combining vector $w_k$, the post-processing SINR (2) at the k-th MS becomes $$\gamma k = \frac{w_k^* H_{kk} f_k f_k^* H_{kk}^* w_k}{w_k^* \left( \sum_{j \neq k} H_{jk} f_j f_j^* H_{jk}^* + \frac{K}{P}\sigma_k^2 \right) w_k} \quad (4)$$

The filter $w_k$ that maximizes $\gamma_k$ in (4) is known as the principal singular vector of $$\frac{H_{kk} f_k f_k^* H_{kk}^*}{\sum_{j \neq k} H_{jk} f_j f_j^* H_{jk}^* + \frac{K}{P}\sigma_k^2 I_{N_r}},$$

which yields $$w_k = \alpha_k \left( \sum_{j \neq k} H_{jk} f_j f_j^* H_{jk}^* + \frac{K}{P}\sigma_k^2 I_{N_r} \right)^{-1} H_{kk} f_k, \quad (5)$$

with the normalization parameter $$\alpha_k = \frac{1}{(H_{kk} f_k) \cdot R_k^{-1}(H_{kk} f_k)}.$$

The proposed receive filter that maximizes per-MS SINR relates the k-th MS MSE and the k-th MS SINR (4) as $$\epsilon_k = \mathbb{E}[|\hat{x}_k - x_k|^2] \quad (6)$$

$$= \frac{1}{|w_k^* H_{kk} f_k|^2} \left( \sum_{j \neq k} |w_k^* H_{jk} f_j|^2 + \frac{K}{P} w_k^* w_k \sigma_k^2 \right)$$

$$= \frac{\sum_{j \neq k} f_j^* H_{jk}^* w_k w_k^* H_{kj} f_j + \frac{K}{P} w_k^* w_k \sigma_k^2}{f_k^* H_{kk}^* w_k w_k^* H_{kk} f_k} = \frac{1}{\gamma k}.$$

This receiver filter (5) is often referred to as MMSE interference rejection combiner (IRC). Note that the normalization factor does not give any impact on the per-link SINR.

Applying (6), the k-th MS SINR $\gamma_k$ is given by $$\gamma k = f_k^* H_{kk}^* \left( \sum_{j \neq k} H_{jk} f_j f_j^* H_{jk}^* + \frac{K}{P}\sigma_k^2 I_{N_r} \right)^{-1} H_{kk} f_k. \quad (7)$$

Given $w_k$ and by letting $R_k = \Sigma_{j \neq k} H_{jk} f_j f^*_j H^*_{jk} + \sigma_k^2 I_{N_r}$, $f_k$ that maximizes per-MS SINR is obtained by $$f_k = v_{max}\{H^*_{kk} R_k^{-1} H_{kk}\}, \quad (8)$$

where $v_{max}\{A\}$ is the dominant singular vector of A. $R_k$ is the MMSE interference plus noise covariance matrix, which can be estimated at the k-th MS by measuring the effective interference channel gain from nearby nonserving BS(s).

An iterative update of transmit vectors may improve the system performance. As the transmit beamforming vector $f_k$ depends on other BS's transmit beamformer vectors but not the receive combining vectors, iteration can be done among transmit beamforming vectors only. The received filter is simply applied once at each receiver when the iteration is done.

Maximizing per-BS SLNR is similar to maximizing per-MS SINR: the role of transmitter and receiver is simply changed. The leakage is defined as the power dissipation from a BS to all undesired MSs. If the leakage level is high, the leakage causes higher interference to adjacent MSs, degrading the system performance. Minimizing the leakage is thus another good strategy to improve the overall system performance.

The k-th BS SLNR is defined as $$\eta k = \frac{|w_k^* H_{kk} f_k|^2}{\sum_{j \neq k} |w_j^* H_{kj} f_k|^2 + \frac{P}{K}\bar{\sigma}_k^2} \quad (9)$$

$$= \frac{f_k^* H_{kk}^* w_k w_k^* H_{kk} f_k}{f_k^* \left( \sum_{j \neq k} H_{kj}^* w_j w_j^* H_{kj} + \frac{K}{P} \bar{\sigma}_k^2 \right) f_k} \quad (10)$$

where $\sigma_k^2$ is the average noise variance at all the MSs but the k-th MS. The term $\Sigma_{j \neq k}|w^*_j H_{hj} f_k|^2$ is the leakage from the k-th BS to all non-serving MSs. The SLNR in the dual uplink channel is equivalent to the downlink SINR, if $\bar{\sigma}_k = \sigma_k$. The transmit beamforming vector that maximizes the SLNR is $$f_k = \beta_k \left( \sum_{j \neq k} H_{kj}^* w_j w_j^* H_{kj} + \frac{K}{P} \bar{\sigma}_k^2 I_{N_t} \right)^{-1} H_{kk}^* w_k, \quad (11)$$

with the normalization parameter $$\beta_k = \frac{1}{(H_{kk}^* w_k) * L_k^{-1} (H_{kk}^* w_k)},$$

where $$L_k = \sum_{i \neq k} H_{kj}^* w_j w_j^* H_{kj} + \frac{K}{P} \bar{\sigma}_k^2 I_{N_t}.$$

The received combining vector that maximizes per-BS SLNR is thus $$w_k = v_{max}\{H_{kk} L_k^{-1} H^*_{kk}\}, \quad (12)$$

The transmit beamforming vector in Max-SLNR algorithm is similar to the receive filter in Max-SINR algorithm. It is understood as a dual of the downlink channel, by exchanging the role of transmitter and receiver and $H_{jk}$ with $H^*_{kj}$ for all j, k. The MSE at the uplink receiver (BS) side can be defined. Similar to Max-SINR approach, the proposed transmit filter does not minimize the uplink MSE, while it minimizes per-link SLNR. The relation between uplink MSE and SLNR is similar to (6):

$$\epsilon_k^{U/L} = \mathbb{E}[|x_k - x_k|^2] = \frac{1}{\eta k}. \quad (13)$$

Note that the receive combining vector $w_k$ can be updated iteratively. When the iteration is done, the transmit beamforming vector in (11) can finally be applied at each BS before the data stream is sent. The MS does not need to know about the final transmit beamforming vector.

The Min-SMSE algorithm achieves a better sum rate than Max-SINR or Max-SLNR. To derive the Min-SMSE algorithm the per-MS MSE may be derived first. With the estimated symbol $\tilde{x}_k$ in (1), the MSE for the k-th MS is defined as $$\epsilon k = \mathbb{E}[|x_k - x_k|^2] \quad (14)$$
$$= w_k^* R w_k + (1 - w_k^* H_{kk} f_k - (H_{kk} f_k)^* w_k)$$

$$= (w_k^* - (H_{kk} f_k)^* R^{-1}) R (w_k^* - (H_{kk} f_k)^* R^{-1})^* + (1 - f_k^* H_{kk}^* R^{-1} H_{kk} f_k),$$

where the total covariance matrix is given by $$R \triangleq \sum_j H_{jk} f_j f_j^* H_{jk}^* + \sigma_k^2 I_{N_r} = R_k + H_{kk} f_k f_k^* H_{kk}^*. \quad (15)$$

The filter that minimize the MSE (14) is obtained by $$w_k = R^{-1} H_{kk} f_k, \quad (16)$$

Since $\mathbb{E}[\hat{x}_k - x_k] = w^*_k H_{kk} f_k - 1 \neq 0$, $w_k$ in (16) is a biased estimator. As $$\epsilon_k = 1 - f_k^* H_{kk}^* R^{-1} H_{kk} f_k = 1 - \frac{(f_k^* H_{kk}^* R^{-1} H_{kk} f_k)^2}{f_k^* H_{kk}^* R^{-1} H_{kk} f_k},$$

the MSE can be modified by $$\epsilon_k = 1 - \frac{f_k^* H_{kk}^* w_k w_k^* H_{kk} f_k}{w_k^* R w_k} \quad (17)$$
$$= \frac{w_k^* R w_k - f_k^* H_{kk}^* w_k w_k^* H_{kk} f_k}{w_k^* R w_k},$$

and taking the inverse of the MSE yields $$\frac{1}{\epsilon_k} = 1 + \frac{f_k^* H_{kk}^* w_k w_k^* H_{kk} f_k}{w_k^* R w_k - f_k^* H_{kk}^* w_k w_k^* H_{kk} f_k} \quad (18)$$
$$= 1 + \frac{|w_k^* H_{kk} f_k|^2}{w_k^* R_k w_k}$$
$$= 1 + \gamma k,$$

which is equivalent to $$\epsilon_k = \frac{1}{1 + \gamma k}$$

Thus the minimize MSE (MMSE) filter used in (16) indeed minimizes the MSE of MS. This MMSE filter, the principal singular vector of $$\frac{H_{kk} f_k f_k^* H_{kk}^*}{\sum_j H_{jk} f_j f_j^* H_{jk}^* + \frac{K}{P} \sigma_k^2 I_{N_r}}$$

seems to be inequivalent to the SINR formula (4). However, the biased MMSE estimator (16) does also maximize the k-th MS post-processing SINR $$[w_k]_{MMSE} = (H_{kk} f_k f_k^* H_{kk}^* + R_k)^{-1} H_{kk} f_k$$

-continued $$= \left(R_k^{-1} - \frac{R_k^{-1}H_{kk}f_k(H_{kk}f_k)^*R_k^{-1}}{1+\sigma_k^{-1}}\right)H_{kk}f_k$$

$$= R_k^{-1}H_{kk}f_k - \frac{R_k^{-1}H_{kk}f_k(H_{kk}f_k)^*R_k^{-1}H_{kk}f_k}{1+\alpha_k^{-1}}$$

$$= R_k^{-1}H_{kk}f_k - \frac{R_k^{-1}H_{kk}f_k\alpha_k^{-1}}{1+\alpha_k^{-1}}$$

$$= \frac{\alpha_k}{1+\alpha_k}R_k^{-1}H_{kk}f_k$$

$$= \frac{\alpha_k}{1+\alpha_k}[w_k]_{Max\text{-}SINR}.$$

Since the biased MMSE filter that minimizes the MSE is a scaled version of unbiased MMSE filter that maximizes SINR, from (4) where the scaling term $$\frac{\alpha_k}{1+\alpha_k}$$

in numerator and denominator can be canceled out, the biased MMSE filter also maximizes the link SINR. With a proper scaling, both $[w_k]_{MMSE}$ and $[w_k]_{Max\text{-}SINR}$ filters yield the same symbol (soft) decoding performance.

After the received beamforming vectors are updated, the transmit beamforming vector can be chosen to minimize the uplink MSE. The uplink MSE is defined by $$\epsilon_k^{UL}=E[|*x_k-x_k|^2]=1-H^*_{kk}w_kL^{-1}w^*_kH^*_{kk}, \quad (19)$$

where the uplink total covariance matrix is given by $$L = \sum_j H^*_{kj}w_jw^*_jH_{kj} + \frac{K}{P}\bar{\sigma}_k^2 I_{N_t} = L_k + H^*_{kk}w_kw^*_kH_{kk}. \quad (20)$$

The choice of the transmit beamforming vector, which is also the MMSE filter, is thus $$f_k=L^{-1}H_{kk}^w w_k, \quad (21)$$

The biasedness of (21) can be removed by multiplying the normalization factor $$\frac{\delta_k}{1+\delta_k},$$

making the filter equivalent to the filter in Max-SLNR algorithm. By applying (16) and (21) iteratively, the individual MSE is minimized.

Note that the objective function that is to be minimized is SMSE, rather than per-MS MSE. The SMSE is defined as $\xi=\Sigma_k\epsilon_k$. We thus need to specify that 1) how does the per-MS MSE minimization leads to the sum-MSE minimization and 2) what is the iterative transmit and receive beamforming algorithm to achieve such a goal.

Minimizing SMSE comes from the fact that the SMSE objective function is non-increasing at each of the update steps. The iterative SMSE algorithm keeps the transmit beamforming vectors same while updating the receive combining vectors, and vise versa. When updating the receive beamforming vector, the choice of the receive beamforming vector at each MS is irrelevant to the choice by other MS. This implies that SMSE minimization is equivalent to individual MSE minimization, meaning the solution that minimizes per-MS MSE is also the solution that minimizes the SMSE. Similarly, when computing transmit beamforming vectors, assuming receive beamformers are fixed, the SMSE minimization problem is equivalent to individual MSE minimization problem because the choice of transmit beamforming vector at a base station does not depend on the decision made by other base stations. Thus an iterative SMSE minimization algorithm is based on individual MSE minimization algorithm for downlink (Max-SINR) and uplink (Max-SLNR).

The SMSE iterative update algorithm includes: receive filter update stage and the transmit beam forming vector update stage. Regarding the receiver algorithm, the SMSE minimization problem can becomes $$\min_{\{w_1,\ldots,w_K\}} \xi = \sum_k \min_{w_k}\epsilon_k, k = 1, \ldots, K. \quad (22)$$

The equality comes from that fact that the choice of $w_k$ that minimizes $\epsilon_k$ independent from $w_j, j\neq k$. This leads to the following MMSE receive filter (16):

$$w_k = R^{-1}H_{kk}f_k = \frac{1}{1+\alpha_k^{-1}}R_k^{-1}H_{kk}f_k. \quad (23)$$

With given receive filter $w_k$, k=1, ..., K, the transmit beam forming vectors can be updated so as to minimize the sum MSE of the dual uplink system. Similar to the downlink case, uplink SMSE problem $$\min_{\{f_1,\ldots,f_K\}} \xi = \sum_k \min_{f_k}\epsilon_k^{UL}, k = 1, \ldots, K, \quad (24)$$

where $\epsilon_k^{UL}$ is the MSE of the dual uplink channel defined in (19). Minimizing sum MSE can be achieved by using the MMSE transmit beamforming vector as in Max-SLNR algorithm:

$$f_k = L^{-1}H^*_{kk}w_k = \frac{1}{1+\beta_k^{-1}}L_k^{-1}H^*_{kk}w_k. \quad (25)$$

It is noteworthy that minimizing product MSE (PMSE) problem leads the similar results as the proposed Min-SMSE algorithm. This is because the selection of transmit and receive filters is aimed at minimizing the MSE. The only difference is that Min-PMSE requires more complicated analysis than Min-SMSE.

Such Min-SMSE, with enough number of iterations, is very close to the actual achievable bounds that maximizes the sum rate. After each iteration, both $\Sigma_k\epsilon k$ and $\Sigma_k\epsilon_k^{UL}$ is decreased. The convergence speed depends on K and signal noise ratio (SNR) level.

Various embodiments implement distributed asynchronous update mechanisms with limited cooperation, where limited cooperation in such context means that BSs (e.g., 30 in FIG. 1; BS$_i$, BS$_j$, and/or BS$_k$ in FIGS. 7 and 10) cooperate only when strong interference is caused to an MS (e.g., 20 in FIG. 1; $MS_i$, $MS_j$, and/or $MS_k$ in FIGS. 7 and 10). The MS measures the strength of interference and then informs to the serving BS about an interfering BS index, and the BS informs the interfering BS(s) with an updated transmit beamforming vector. Other embodiments implement centralized (i.e., performed using a central controller or entity) synchronous update mechanisms with limited cooperation (referred to as a centralized algorithm; e.g., refer to FIGS. 5A-7) or asynchronously in a distributed manner (referred to as a distributed algorithm; e.g., refer to FIGS. 8A-10).

According to various embodiments, limited cooperation is a valid approach because of the following reasons. First, as the channel estimation error is generally proportional to the inverse of the receive signal power, the measured channel can be inaccurate if the received power is weak. Second, a weak interference does not contribute much to the beamforming vector design. From (23), the interference rejection combiner can autonomously ignore whose power level is low. Sharing of such unnecessary information that may not be used for computing the beamforming vector is thus redundant.

Based on the above observation, a limited cooperation mechanism may be implemented for more efficient communication. Both centralized and distributed algorithms are presented in Alg. 1 and Alg. 2, respectively. The degree of cooperation can be adjusted by changing a cutoff threshold adaptively. For instance, the cutoff threshold can be associated with either the SNR, the target SINR, or the number of cooperating nodes. A key difference between centralized and distributed cooperation is on the update timing. The distributed algorithm updates the beamforming vectors asynchronously, while the centralized algorithm updates synchronously. Note that for the asynchronous update, after enough iterations, the performance may converge to that of the synchronous update. This is because the I-CBF algorithm is designed to minimize the MSE at each node per iteration. Even after updating the beamforming vectors in each cell asynchronously, as long as other beamforming vectors that are affected by the change are also updated, the sum MSE cannot be increased.

---

Algorithm 1 Centralized Limited Cooperation

---

Compute initial $f_k$ using (11) for k = 1, ... , K
BS k: Informs $f_k$ to MS k
MS k: Initialize $R_k$ and
for j = 1 to K do
   if $|H_{jk}f_j|^2 > \gamma|H_{kk}f_k|^2$ then
     Update $R_j = R_k + H_{jk}f_jf_j^*H_{jk}^*$
   end if
end for
MS k: Report $R_k$ to the central entity
Central Entity: Compute $f_k$ and $w_k$ using (11) and (5) interchangeably for k = 1 ... , K
Central Entity: Forward $f_k$ to BS k
MS k: Update $w_k$

---

Algorithm 2 Distributed Limited Cooperation

---

Compute initial $f_k$ using (11) for k = 1, ... , K
BS k: Informs $f_k$ to MS k
MS k: Initialize $R_k$ and ---
-continued Algorithm 2 Distributed Limited Cooperation

--- for j = 1 to K do
   if $|H_{jk}f_j|^2 > \gamma|H_{kk}f_k|^2$ then
     Update $R_h = R_k + H_{jk}f_jf_j^*H_{jk}^*$
     Store j to $I_k$
   end if
end for
MS k: Report $R_k$ to BS k
BS k: Compute $f_k$ using (11) and inform $f_k$ to the BS(s) in the stored index $I_k$
BS(s) in the index $I_k$: Update beamforming vector and inform the change to the BS(s) that cause interference to the serving MS
BS(s): Update until either there is no update or timer expires

---

The performance of the proposed I-CBF algorithms are presented as follows. The reference algorithms that are compared are point-to-point upper bound (PP-UB) and non-coordinated beamforming. The PP-UB is the sum throughput when crosstalk between cells are zero, i.e., $H_{jk}=0$ if $j \neq k$. As no other cell interference exists, each MS tries to maximize its own received signal power. In the beamforming system, such approach is known as (single-cell) eigen-beamforming. The beamforming vectors $w_k$ and $f_k$ are respectively the principal left and right singular vectors of $H_{kk}$. In this case, the achievable sum rate is given as $$\mathcal{R}_{PP} = \sum_k \log_2\left(1 + \frac{P}{K}\frac{|w_k^* H_{kk} f_k|^2}{\sigma_k^2}\right). \quad (26)$$

In the non-coordinated beamforming, beamforming vectors are chosen to maximize its own effective channel gain after treating all the other-cell interference as noise. The MS is equipped with the MMSE-IRC filter to maximize the link SINR, but the BS does not cooperatively update its transmit beamforming vectors. This approach is useful for cell-interior MSs whose interference noise ratio (INR) level is much lower than the SNR level. As the MS moves to the cell boundary, however, INR becomes higher and this non-coordinated approach may become unsuitable.

For algorithms for non-coordinated beamforming with interference-ignorant receiver, both BS and MS put no effort on mitigating inter-cell interference. The transmit beamforming vector $f_k$ is the dominant right singular vector of $H_{kk}$. The receive filter performs the maximum ratio combining, $$w_k = \frac{H_{kk} f_k}{\|H_{kk} f_k\|},$$

to maximize its own effective channel gain.

Figure 2:
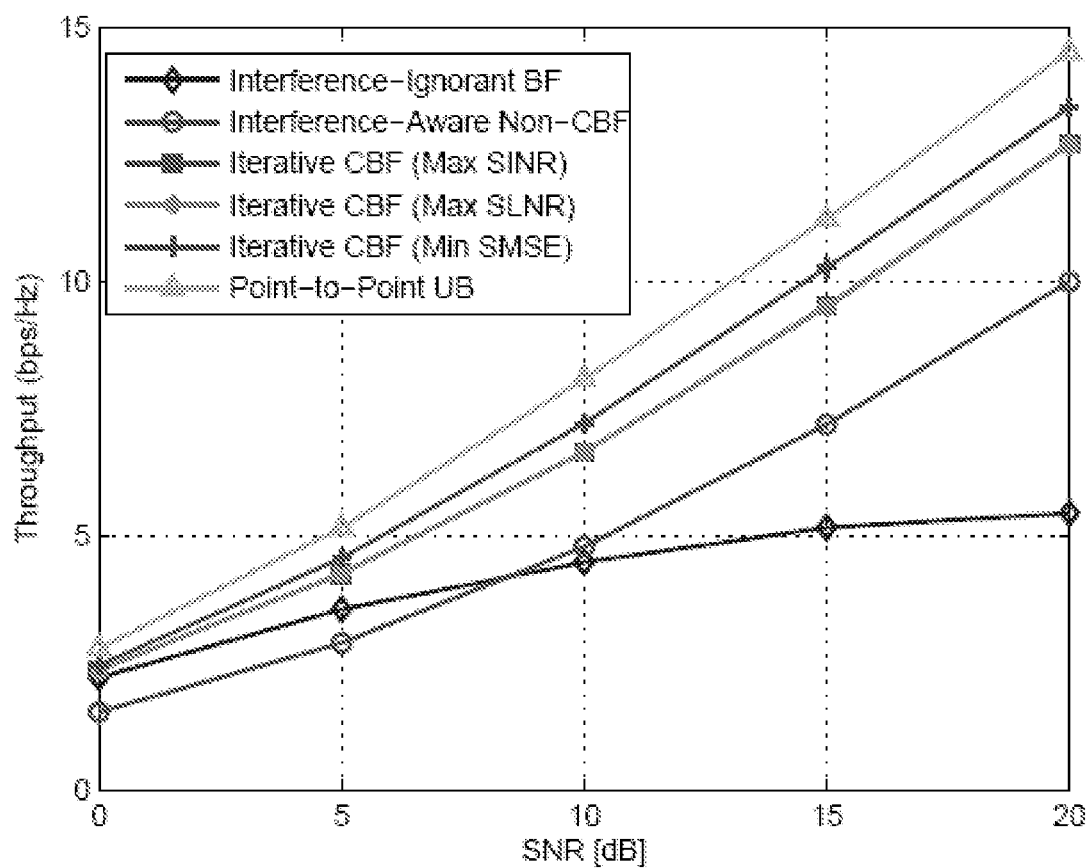
FIG. 2 is a diagram illustrating a sum rate comparison according to various embodiments of the disclosure.

FIG. 2 illustrates sum throughput performance comparison with $K=N_t=N_r=2$ at SIR 0 dB is presented. The proposed Max-SINR and Max-SLNR algorithms outperform the non-cooperative algorithms, but are worse than the Min-SMSE algorithm. The Min-SMSE algorithm is closest to the PP-UB, due to the joint optimization of transmitter and receiver to improve both SINR and SLNR iteratively.

Figure 3A:
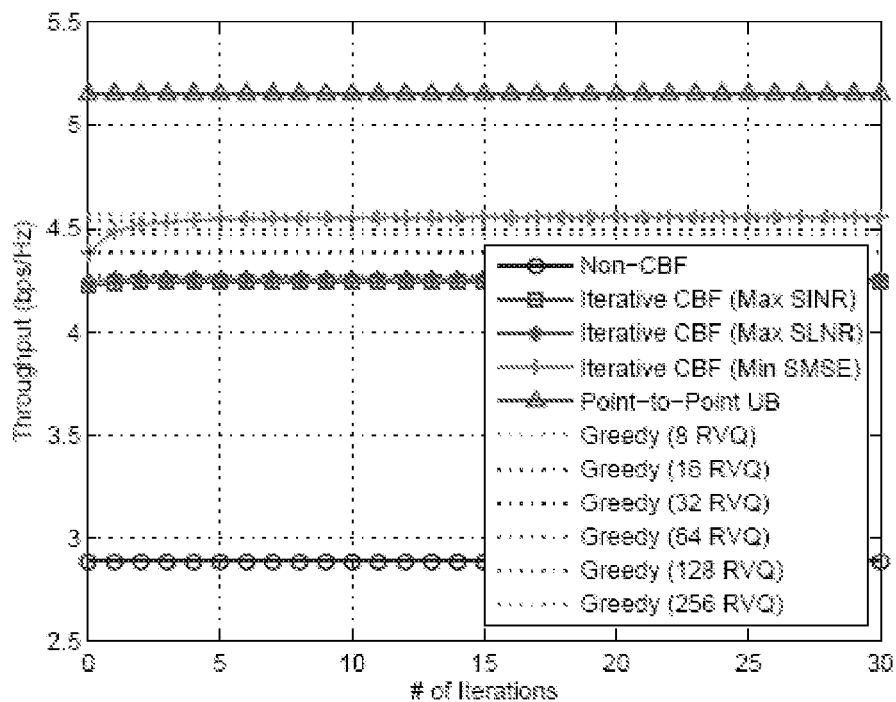
FIGS. 3A-3B are diagrams illustrating sum rate comparisons with different number of iterations according to various embodiments of the disclosure.
Figure 3B:
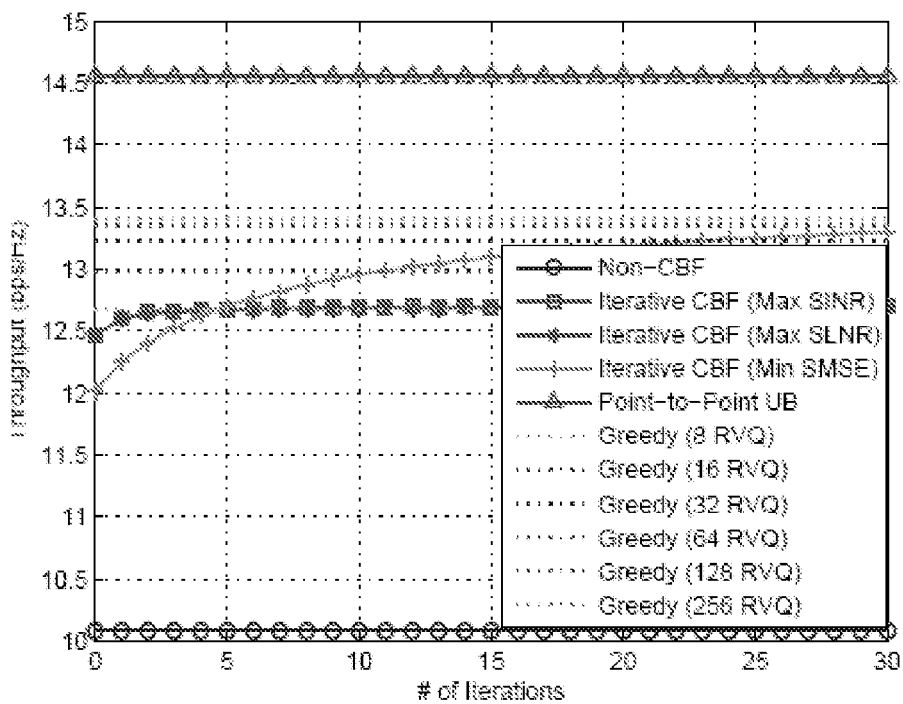

Returning to FIG. 1, to see the achievability of the I-CBF algorithms, a number of unit-norm vectors may be randomly generated and an exhaustive, greedy search may be made of the unit-norm vectors. With given set of greedy vectors $M=\{g_1, \ldots, g_M\}$, $\|g_k\|_2^2=1$, the greedy algorithm chooses the beamforming vectors that maximize the sum throughput (3). The method to generate vectors is often referred to as random vector quantizer (RVQ). The computational complexity of the greedy search algorithm is $M^K$ and as M goes to infinity, it can be understood that the set of chosen vectors are close to optimum. The simulation results with greedy search approach are presented in FIGS. 3(a) and 3(b). In FIG. 3(a), when SNR is fixed at 5 dB, the proposed Min-SMSE algorithm is close to the greedy search algorithm with M=256 per node. When SNR is fixed at 20 dB, as in FIG. 3(b), the proposed Min-SMSE algorithm is close to 64 RVQ greedy search, although with a slower convergence speed than low SNR region. Based on the simulation results, the proposed Min-SMSE iterative CBF algorithm is very close to the achievable bound of the system.

Figure 4:
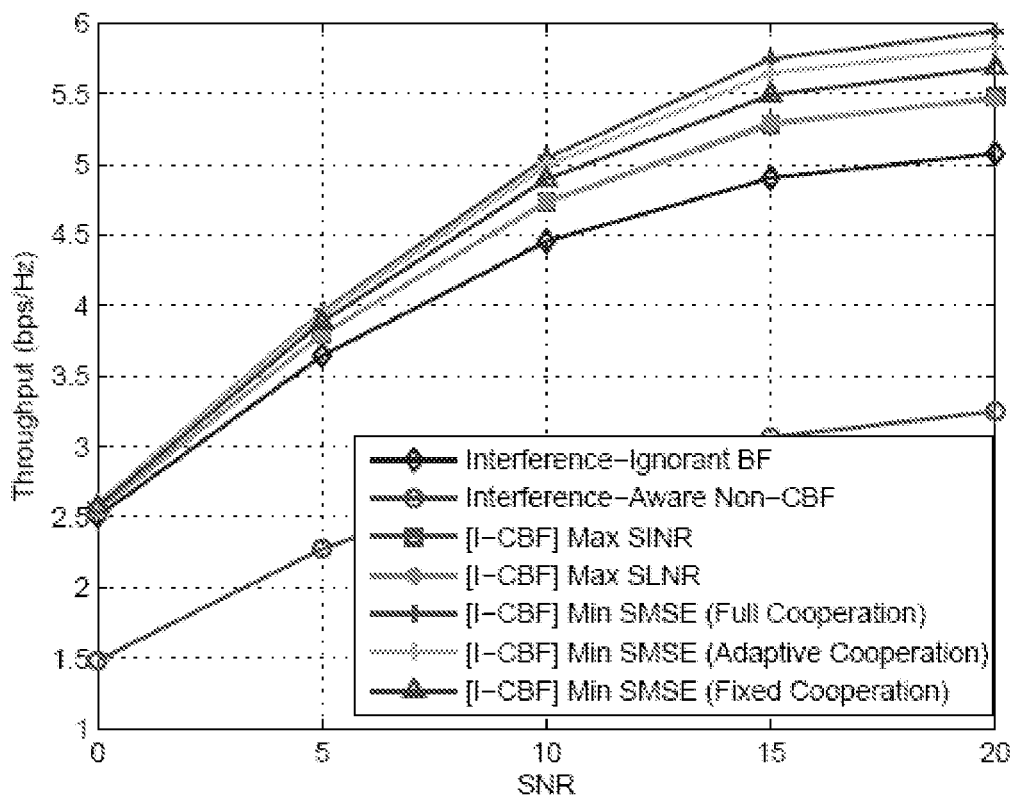
FIG. 4 is a diagram illustrating a sum rate comparison according to various embodiments of the disclosure.

In FIG. 4, throughput performance for sum rate with limited cooperation (K=16, $N_t=N_r=4$). is presented. It can be assumed that the channel estimation error is proportional to the inverse of the received power. The cutoff threshold γ is set at 6 dB, so the interference with power that is more than 6 dB lower than the desired signal can be ignored. From the simulation results, the adaptive limited cooperation shows very close performance to the full cooperation and clearly outperforms the fixed limited cooperation with fixed number of interference (K/2) to compute the filters. Note that the average number of interference links that is shared for cooperation is approximately 45% of the all the interfering nodes. In other embodiments, other percentages may be implemented, for instance, based on which cutoff parameter optimization for limited cooperation is applied.

Figure 7:
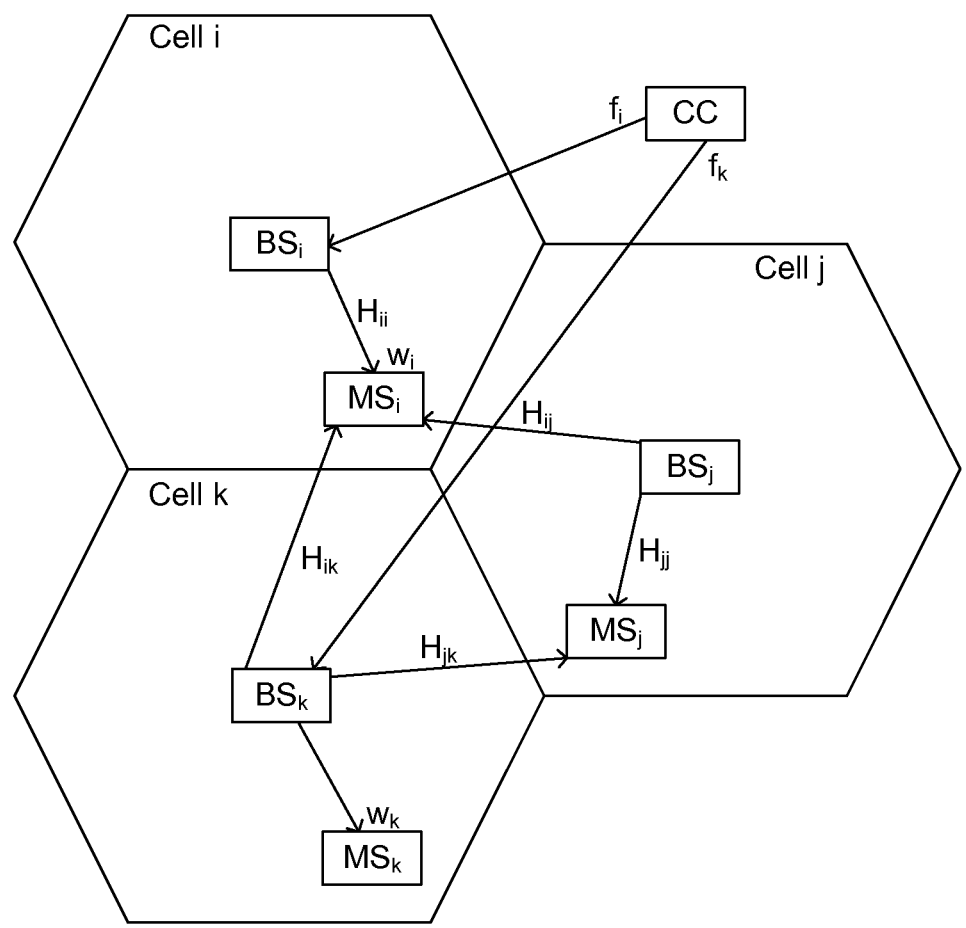
FIG. 7 illustrates a network according to various embodiments of the disclosure.

FIG. 7 illustrates a network 700 (e.g., 10 in FIG. 1) having a plurality of cells (cell i, cell j, and cell k) having respective base stations $BS_i$, $BS_j$, and $BS_k$ (e.g., 30 in FIG. 1). The network 700 includes a plurality of mobile stations $MS_i$, $MS_j$, and $MS_k$ (e.g., 20 in FIG. 1). Mobile station $MS_i$ is served by base station $BS_i$, mobile station $MS_j$ is served by base station $BS_j$, and mobile station $MS_k$ is served by base station $BS_k$.

Figure 5A:
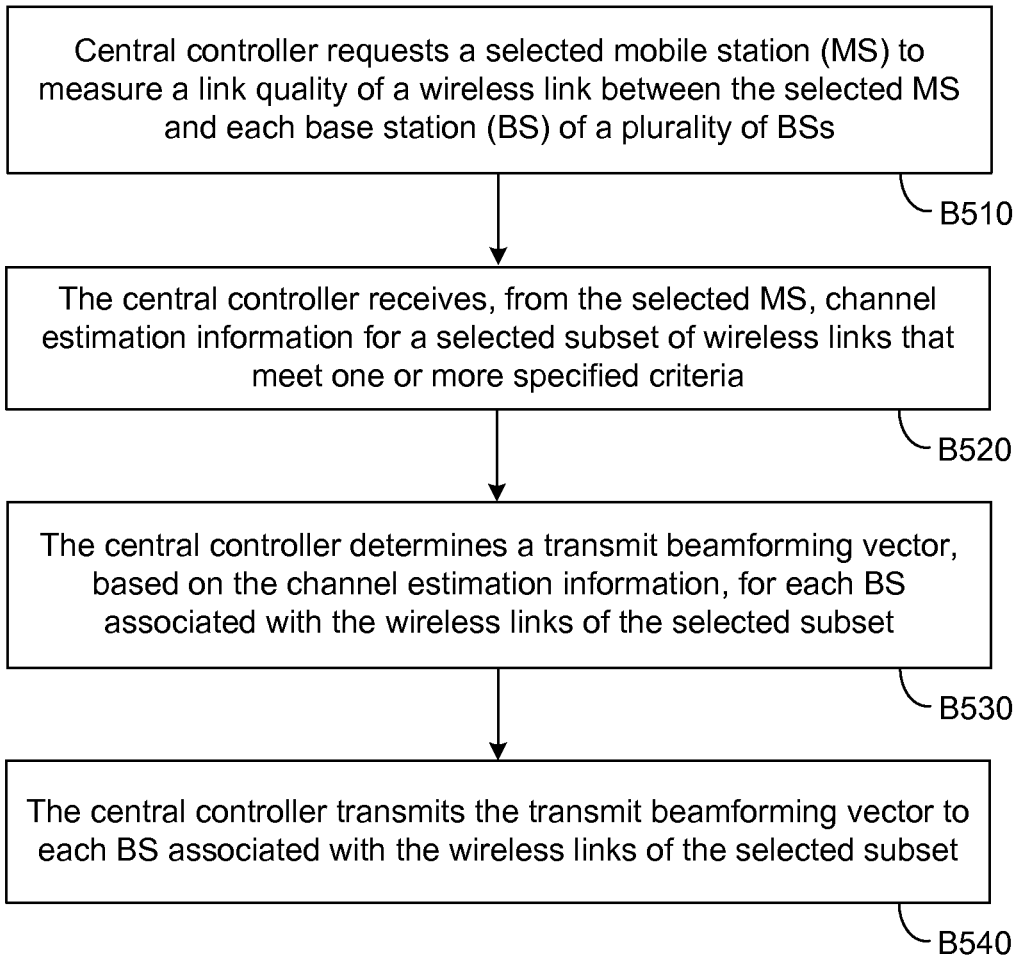
FIG. 5A-5B are flowcharts of an iterative coordinated beamforming method according to various embodiments of the disclosure.
Figure 6A:
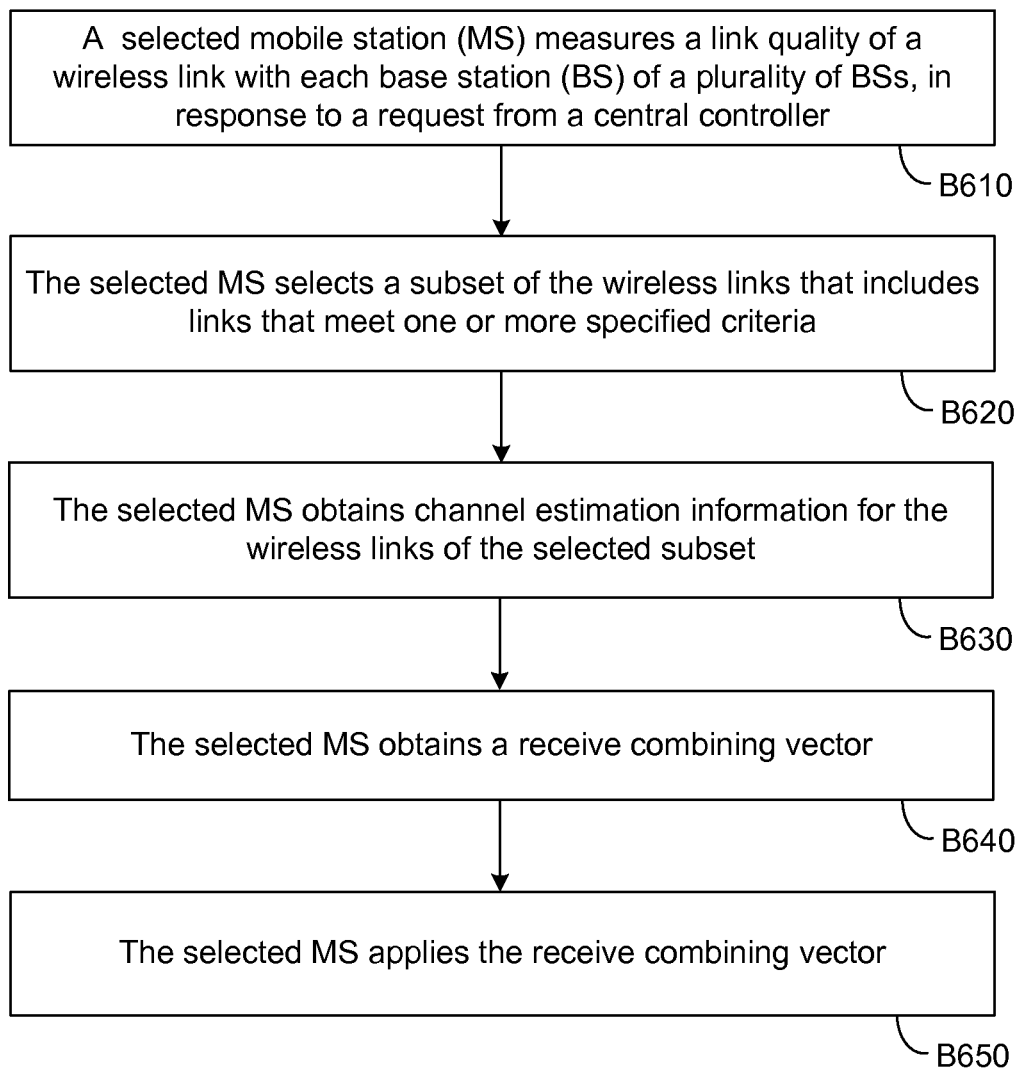
FIG. 6A-6B are flowcharts of a method performed by a mobile station according to various embodiments of the disclosure.

FIG. 5A is a flowchart of a limited cooperation algorithm or method B500 that updates beamforming vectors synchronously ("centralized" algorithm) in the network 700. FIG. 6A is a flow chart of a method B600 that may be performed by one or more mobile stations (e.g., mobile stations $MS_i$, $MS_j$, and $MS_k$ in FIG. 7) of the network. With reference to FIGS. 5A, 6A, and 7, in particular embodiments, one or more portions of the methods B500 and B600 may correspond to some or all of Algorithm 1, above.

In various embodiments, the network 700 may include a central controller CC that implements the method B500. In some embodiments, the central controller may be a BS of the plurality of BSs (e.g., $BS_i$, $BS_j$, and $BS_k$ in FIG. 7). In other embodiments, the central control may be a different entity, such as a BS connected with subordinate radio heads (RRHs), pico cells, or the like.

At block B510, a central controller (e.g., CC in FIG. 7) sends a request to a selected one or more of the MS (e.g., $MS_i$, $MS_j$, and/or $MS_k$ in FIG. 7) to measure a link quality (e.g., SNR) of a wireless link (channel) with each of one or more of the BSs (e.g., $BS_i$, $BS_j$, and/or $BS_k$ in FIG. 7), such as the BS serving the selected MS and other BSs that may be interfering.

In the example of FIG. 7, the central controller CC may request the mobile station $MS_i$ (and/or mobile stations $MS_j$ and/or $MS_k$) to measure link qualities of a link ($H_{ii}$) between the mobile station $MS_i$ and the base station $BS_i$, a link ($H_{ik}$) between the mobile station $MS_i$ and the base station $BS_k$, and a link ($H_{ij}$) between the mobile station $MS_i$ and the base station $BS_j$.

With reference to FIGS. 5A, 6A, and 7, in some embodiments, block B510 may include, for example, determining (at the central control) an initial transmit beamforming vector (e.g., using (11)) and providing the transmit beamforming vector to the selected MS to initialize the measurement of the links.

In response to the request, the selected MS may perform the method B600. For instance, in response to the request, at block B610, the selected MS may measure the link quality of the wireless link(s) in any suitable manner, such as (but not limited to) via handover (HO) measurement signaling. Other signals such as cell-specific reference signals can also be used for link-quality measurement.

At block B620, the selected MS selects a subset of the wireless links that have a link quality that meets one or more specified criteria (e.g., is higher than a selected threshold, within a specified absolute range of values, within a specified relative range of values, a specified number of strongest wireless links, etc.).

For example, if the links with base stations $BS_i$ and $BS_k$ meet the specified criteria (and the link with base station $BS_j$ does not), the mobile station $MS_i$ may select a subset that includes links $H_{ii}$ and $H_{ik}$ (but not $H_{ij}$).

At block B630, the selected MS (e.g., MS) obtains channel estimation information for each of the selected subset of wireless links (e.g., links $H_{ii}$ and $H_{ik}$).

At block B520, the central controller receives, from the selected MS, the channel estimation information for each of the selected subset of wireless links. The central controller may receive the channel estimation information via the BS serving the selected MS or directly from the selected MS via over-the-air communication.

For example, the central controller CC may receive the channel estimation information for the links $H_{ii}$ and $H_{ik}$ directly from the mobile station $MS_i$ or from the mobile station $MS_i$ via the base station $BS_i$, which is serving the mobile station $MS_i$.

At block B530, based on the channel estimation information, the central controller determines a transmit beamforming vector (e.g., $f_i$, $f_j$, and $f_k$) for each of the selected subset of wireless links. The central controller may also determine a receive combining vector (e.g., $w_i$, $w_j$, and $w_k$) for each of the selected subset of wireless links. According to some embodiments in which the centralized algorithm is implemented, determination of the vectors may be iteratively performed at the central controller only.

The transmit beamforming vector and/or the receive combining vector may be based on a performance metric, such as Max SINR, Max SLNR, and Min SMSE. For example, if Min SMSE is the performance metric, the transmit beamforming vector may be determined using (11) and the receive combining vector may be determined using (5). If Max SINR is the performance metric, the transmit beamforming vector may be determined using (8) and the receive combining vector may be determined using (5). If Max SLNR is the performance metric, the transmit beamforming vector may be determined using (11) and the receive combining vector may be determined using (12).

At block B540, the central controller transmits the respective transmit beamforming vector to the BSs of the selected subset of wireless links to allow the selected BSs to apply the respective transmit beamforming vector. In some embodiments, the central controller provides the respective receive combining vector (or dedicated pilots) to the MSs served by the BSs of the selected subset of wireless links. For instance, the central controller may transmit the respective receive combining vector to the appropriate one of the selected BSs, in turn, each of the selected BSs may transmit the receive combining vector (received from the central controller) or dedicated pilots (weighted by the transmit beamforming vector) to the respective MS served by the BS. Thus, at block B640, the selected MS may obtain the receive combining vector from the central controller or determine the receive combining vector. Accordingly, the MS(s) may apply the receive combining vector or compute the receive combining vector using the dedicated pilots (block B650). Because the receive combining vector can be applied locally, no explicit communication to the MS(s) is required.

For example, the central controller CC may transmit the transmit beamforming vector $f_i$ to the base station $BS_i$. The CC may also transmit the transmit beamforming vector $f_k$ to the base station $BS_k$. In some embodiments, the central controller CC may also transmit the receive combining vector $w_i$ (or a dedicated pilot for deriving such vector) to the base stations $BS_i$ and the receive combining vector $w_k$ to the base station $BS_k$. The base station $BS_i$ may provide the receive combining vector $w_i$ to the mobile station $MS_i$, and the base station $BS_k$ may provide the receive combining vector $w_k$ to the mobile station $MS_k$. Accordingly, the mobile station $MS_i$ may apply the receive combining vector $w_i$, and the mobile station $MS_k$ may apply the receive combining vector $w_k$.

In the examples provided, the central controller initiates a single mobile station (mobile station MS) at block B510. It should be noted, however, that the central controller may initiate more than one mobile station at block B510, such as mobile stations $MS_i$, $MS_j$, and/or $MS_k$. Blocks B520-B540 and/or B610-B650 may proceed for each of these mobile stations in a similar manner as mobile station $MS_i$, exemplified above (e.g., at block B610, each MS selects a respective subset of wireless links; at block B620, each MS obtains channel state information for their respective subset of links; etc.).

Figure 5B:
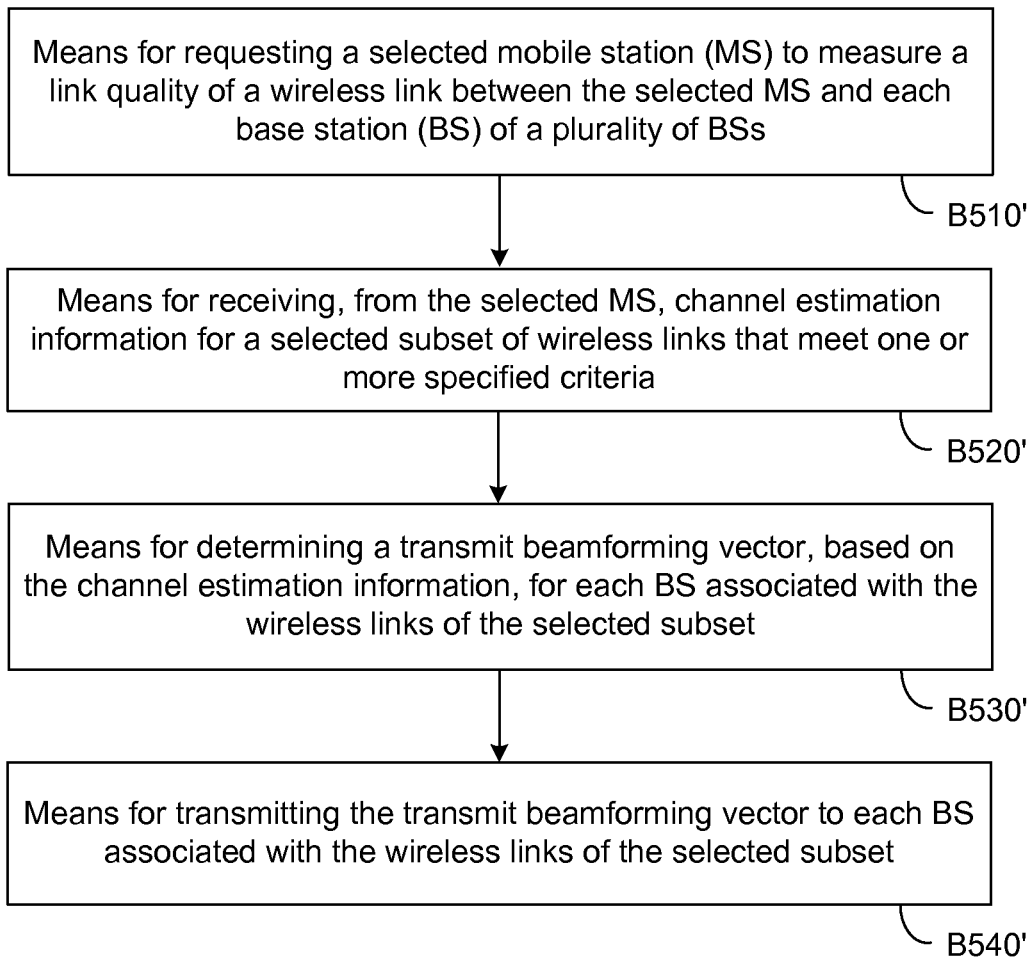

The method B500 of FIG. 5A may be performed by various hardware and/or software component(s) and/or module(s) corresponding to the means-plus-function blocks B500' illustrated in FIG. 5B. In other words, one or more of blocks B510 through B540 illustrated in FIG. 5A may correspond to one or more of means-plus-function blocks B510' through B540' illustrated in FIG. 5B.

Figure 6B:
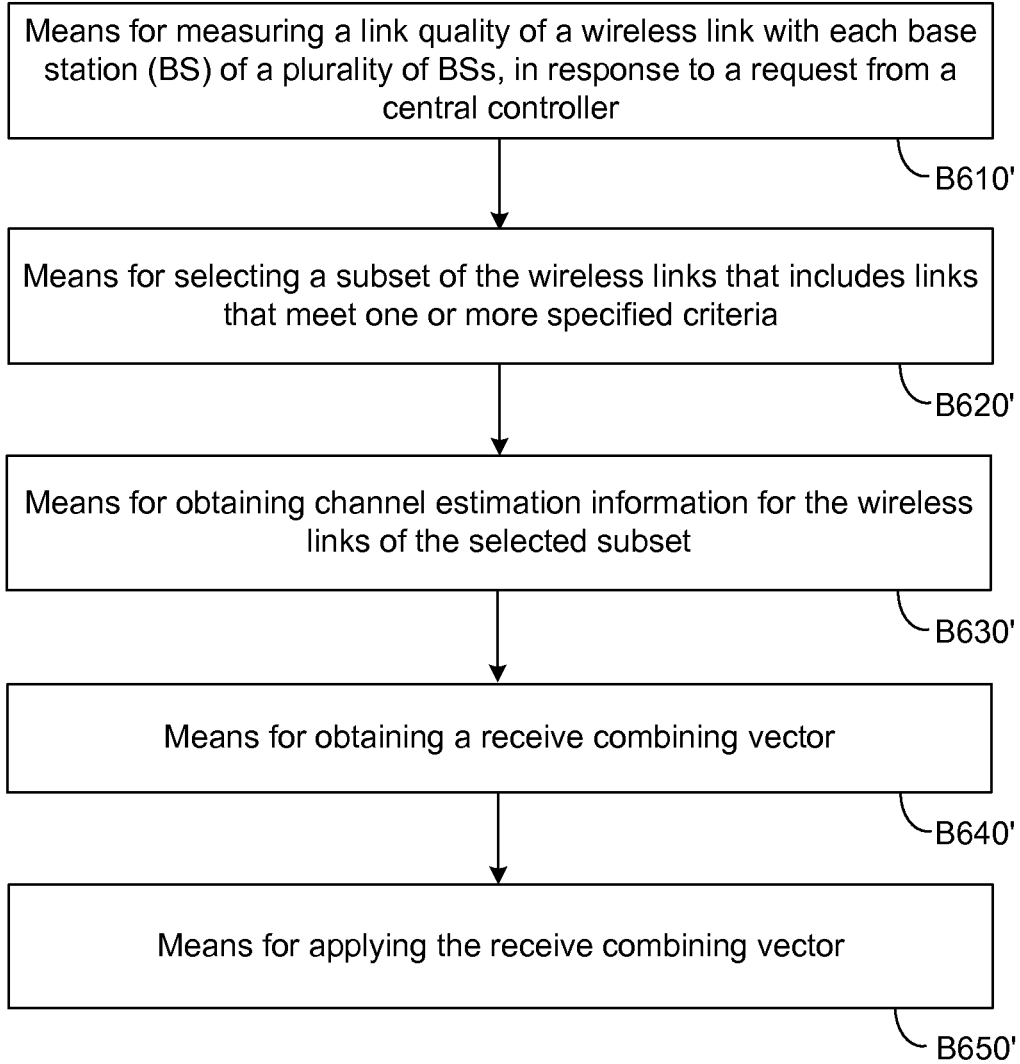

The method B600 of FIG. 6A may be performed by various hardware and/or software component(s) and/or module(s) corresponding to the means-plus-function blocks B600' illustrated in FIG. 6B. In other words, one or more of blocks B610 through B650 illustrated in FIG. 6A may correspond to one or more of means-plus-function blocks B610' through B650' illustrated in FIG. 6B.

Figure 10:
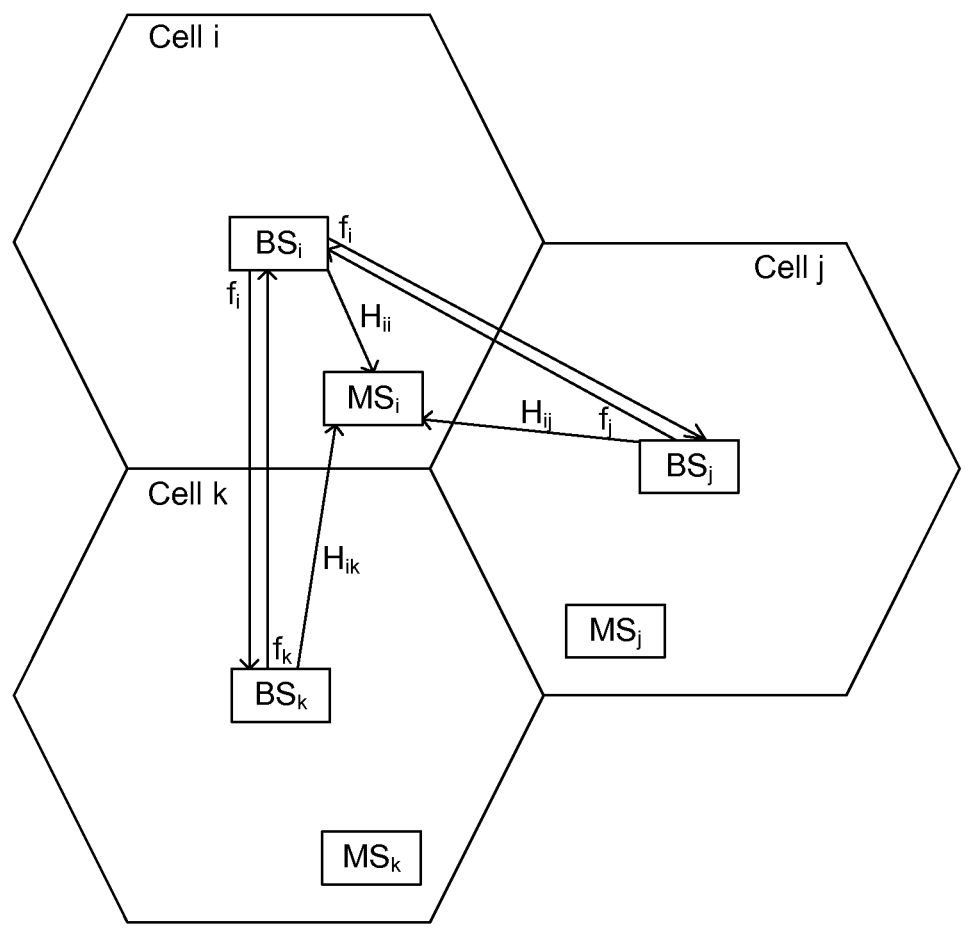
FIG. 10 illustrates a network according to various embodiments of the disclosure.

FIG. 10 illustrates a network 1000 (e.g., 10 in FIG. 1) having a plurality of cells (cell i, cell j, and cell k) having respective base stations $BS_i$, $BS_j$, and $BS_k$ (e.g., 30 in FIG. 1). The network 1000 includes a plurality of mobile stations $MS_i$, $MS_j$, and $MS_k$ (e.g., 20 in FIG. 1). Mobile station $MS_i$ is served by base station $BS_i$, mobile station $MS_j$ is served by base station $BS_j$, and mobile station $MS_k$ is served by base station $BS_k$.

FIG. 8A is a flowchart of a limited cooperation algorithm or method B800 that updates beamforming vectors asynchronously ("distributed" algorithm). FIG. 9A is a flow chart of a method B900 that may be performed by one or more mobile stations (e.g., mobile stations $MS_i$, $MS_j$, and $MS_k$ in FIG. 10) of the network. With reference to FIGS. 8A, 9A, and 10, in particular embodiments, one or more portions of the methods B800 and B900 may correspond to some or all of Algorithm 2, above.

At block B610, a selected BS (or more than one BS) of the plurality of the BSs (e.g., $BS_i$, $BS_j$, and/or $BS_k$ in FIG. 10) sends a request to a selected MS served by the selected BS (e.g., $MS_i$, $MS_j$, and/or $MS_k$, respectively, in FIG. 10) to measure a link quality (e.g., SNR) of a wireless link (channel) with each of one or more of the BSs, such as the selected BS serving the selected MS and other BSs that may be interfering.

In the example of FIG. 10, the base station $BS_i$, may request the mobile station $MS_i$ (and/or the base station $BS_j$ may request the mobile station $MS_j$ and/or the base station $BS_k$ may request the mobile station $MS_k$) to measure link qualities of a link ($H_{ii}$) between the mobile station $MS_i$ and the base station $BS_i$, a link ($H_{ik}$) between the mobile station $MS_i$ and the base station $BS_k$, and a link ($H_{ij}$) between the mobile station $MS_i$ and the base station $BS_j$.

With reference to FIGS. 8A, 9A, and 10, in some embodiments, block B610 may include, for example, determining (at the selected BS) an initial transmit beamforming vector (e.g., using (11)) and providing the transmit beamforming vector to the initiated MS to initialize the measurement of the links.

In response to the request, the selected MS may perform the method B900. For instance, in response to the request, at block B910, the selected MS may measure the link quality of the wireless link(s) in any suitable manner, such as (but not limited to) via handover (HO) measurement signaling. Other signals such as cell-specific reference signals can also be used for link-quality measurement.

At block B920, the selected MS selects a subset of the wireless links that have a link quality that meets one or more specified criteria (e.g., is higher than a selected threshold, within a specified absolute range of values, within a specified relative range of values, a specified number of strongest wireless links, etc.). The selected subset may correspond to the BSs interfering with the selected MS. The selected subset of interfering BSs may be referred to as an interfering BS index.

For example, the mobile station $MS_i$ may select a subset that includes links $H_{ij}$ and $H_{ik}$, if the links with base stations $BS_j$ and $BS_k$ meet the specified criteria. For instance, the base stations $BS_j$ and $BS_k$ may be interfering with the mobile station $MS_i$. Thus, the interfering BS index may include the base stations $BS_j$ and $BS_k$.

At block B930, the selected MS (e.g., $MS_i$) obtains channel estimation information for each of the selected subset of wireless links (e.g., links $H_{ij}$ and $H_{ik}$).

At block B820, the selected BS receives, from the selected MS, the channel estimation information for each of the selected subset of wireless links.

At block B830, based on the channel estimation information, the selected BS determines a transmit beamforming vector (e.g., $f_i$). The selected MS may also obtain a receive combining vector (e.g., $w_i$) (block B940). In some embodiments, the selected MS may determine the receive combining vector to obtain the receive combining vector. In other embodiments, the receive combining vector may be determined by the selected BS and provided to the selected MS.

The transmit beamforming vector and/or the receive combining vector may be based on a performance metric, such as Max SINR, Max SLNR, and Min SMSE. For example, if Min SMSE is the performance metric, the transmit beamforming vector may be determined using (11) and the receive combining vector may be determined using (5). If Max SINR is the performance metric, the transmit beamforming vector may be determined using (8) and the receive combining vector may be determined using (5). If Max SLNR is the performance metric, the transmit beamforming vector may be determined using (11) and the receive combining vector may be determined using (12).

At block B840, the selected BS transmits the transmit beamforming vector to the BSs of the selected subset of wireless links (the BSs in the interfering BS index) to allow the BSs in the interfering BS index to apply the respective transmit beamforming vector.

For example, the base station $BS_i$ may transmit the transmit beamforming vector $f_i$ to each of the interfering base stations $BS_j$ and $BS_k$. The base station $BS_i$ (or the mobile station MS) may also transmit the receive combining vector $w_i$ to each of the interfering base stations $BS_j$ and $BS_k$. Each of the base stations $BS_j$ and $BS_k$ may apply the transmit beamforming vector to update their respective transmit beamforming vector accordingly. In some embodiments, each of the mobile stations $MS_j$ and $MS_k$ may apply the receive combining vector) and update their respective receive combining vector accordingly (block B950).

At block B850, the selected BS receives the updated transmit beamforming vector for the interfering BSs (and optionally the updated receive combining vector for the corresponding mobile stations). Accordingly, the transmit beamforming vector for the selected BS (and/or the receive combining vector for the selected MS) may be iteratively updated based on the received updated vectors. The BSs (and/or MSs) may continue to update in an iterative manner until no update is required or upon occurrence of a predetermined event (e.g., expiration of a timer).

For example, the base station $BS_i$ may receive the updated vectors $f_j$ and $f_k$ from the base stations $BS_j$ and $BS_k$, respectively, and the mobile station $MS_i$ may receive the updated vectors $w_j$ and $w_k$ from the mobile stations $MS_j$ and $MS_k$, respectively. Accordingly, the transmit beamforming vector $f_i$ and the receive combining vector $w_i$ may be updated.

The method B800 of FIG. 8A may be performed by various hardware and/or software component(s) and/or module(s) corresponding to the means-plus-function blocks B800' illustrated in FIG. 8B. In other words, one or more of blocks B810 through B860 illustrated in FIG. 8A may correspond to one or more of means-plus-function blocks B810' through B860' illustrated in FIG. 8B.

Figure 9B:
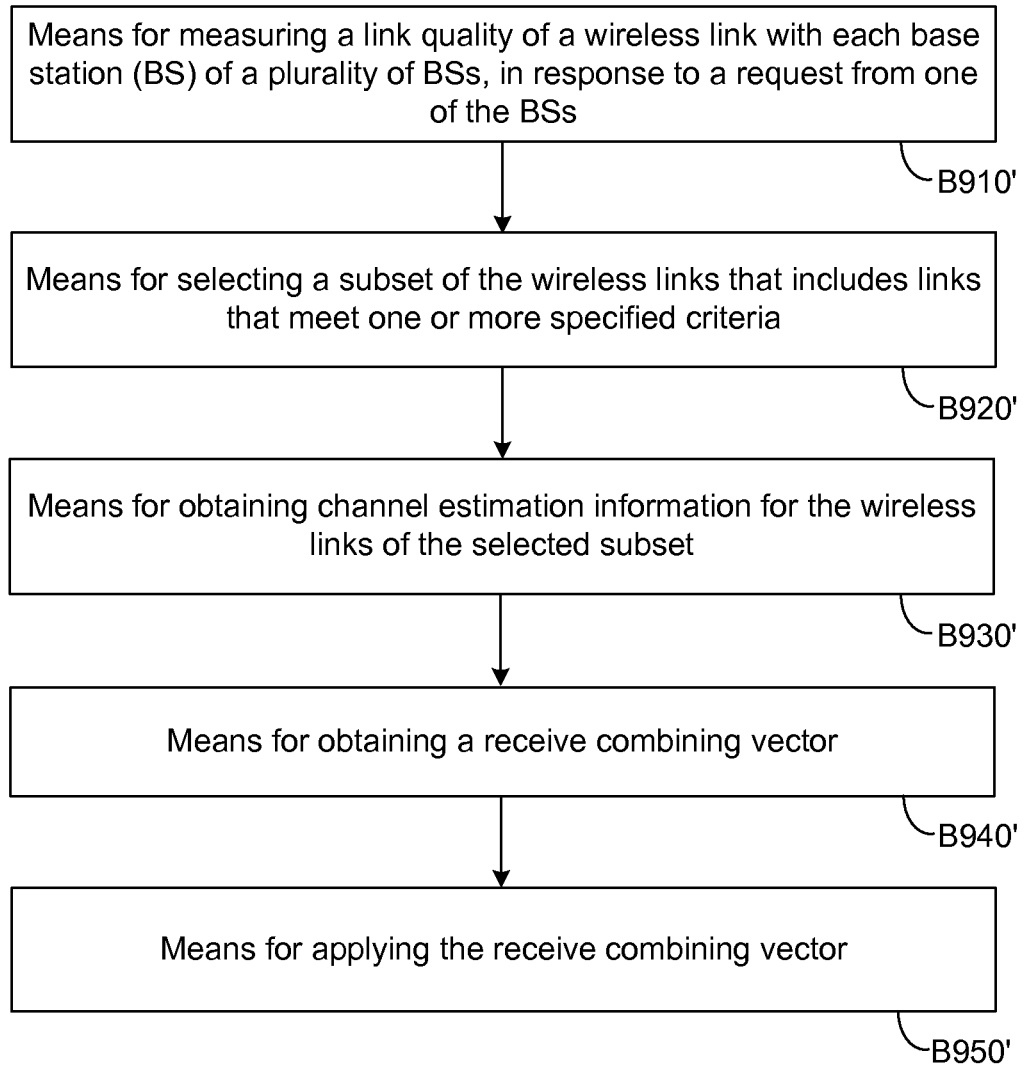

The method B900 of FIG. 9A may be performed by various hardware and/or software component(s) and/or module(s) corresponding to the means-plus-function blocks B900' illustrated in FIG. 9B. In other words, one or more of blocks B910 through B950 illustrated in FIG. 9A may correspond to one or more of means-plus-function blocks B910' through B950' illustrated in FIG. 9B.

Figure 11:
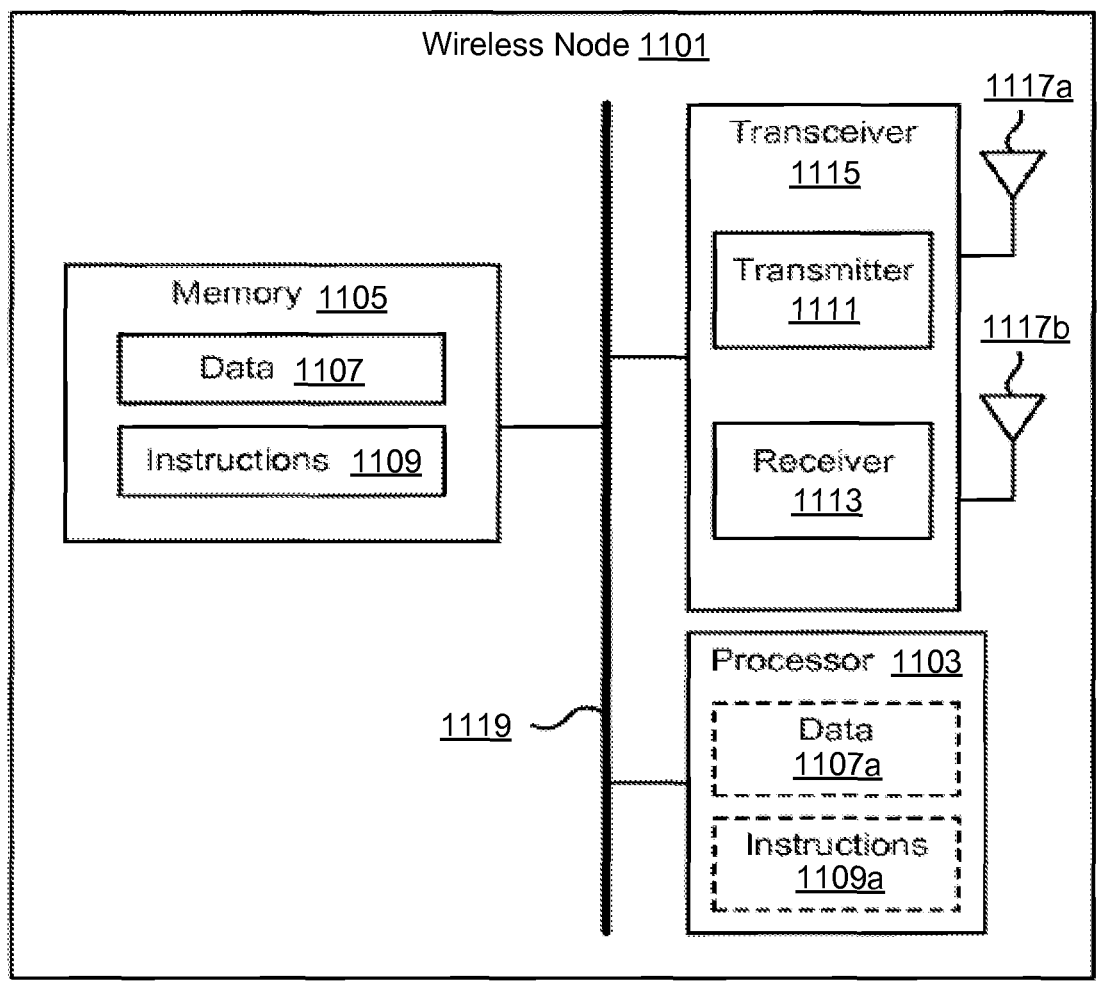
FIG. 11 illustrates certain components that may be included within a wireless node according to various embodiments of the disclosure.

FIG. 11 illustrates certain components that may be included within a wireless node 1101. With reference to FIGS. 1-11, the wireless node 1101 may be one or more of the MSs 20, the BSs 30, or both.

The wireless node 1101 may include a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the wireless node 1101, in an alternative configuration, a combination of processors (e.g., an ARM and DSP) could be used.

The wireless node 1101 may include memory 1105. The memory 1105 may be any electronic component capable of storing electronic information. The memory 1105 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1107 and instructions 1109 may be stored in the memory 1105. The instructions 1109 may be executable by the processor 1103 to implement the methods disclosed herein. Executing the instructions 1109 may involve the use of the data 1107 that is stored in the memory 1105. When the processor 1103 executes the instructions 1107, various portions of the instructions 1109a may be loaded onto the processor 1103, and various pieces of data 1107a may be loaded onto the processor 1103.

The wireless node 1101 may also include a transmitter 1111 and a receiver 1113 to allow transmission and reception of signals between the wireless node 1101 and a remote location. The transmitter 1111 and receiver 1113 may be collectively referred to as a transceiver 1115. An antenna 1117 may be electrically coupled to the transceiver 1115. The wireless node 1101 may also include (not shown) multiple transmitters, multiple receivers, multiple transceivers and/or multiple antenna.

The various components of the wireless node 1101 may be coupled together by one or more buses, which may include a power bus, a control signal bus, a status signal bus, a data bus, etc. For the sake of clarity, the various buses are shown as bus system 1119.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of coordinated beamforming performed at a central controller in a network having a plurality of mobile stations and a plurality of base stations, the method comprising:
   requesting, by the central controller, a selected mobile station (MS) to measure a link quality of a wireless link between the selected MS and each base station (BS) of the plurality of BSs;
   receiving, from the selected MS, channel estimation information for wireless links of a selected subset of the wireless links that meet one or more specified criteria;
   determining, by the central controller, a transmit beamforming vector for each BS associated with the wireless links of the selected subset and a receive combining vector for each of the wireless links of the selected subset, based on the channel estimation information;
   providing, by the central controller, the receive combining vector to each MS of each BS associated with the wireless links of the selected subset; and
   transmitting the transmit beamforming vector to each BS associated with the wireless links of the selected subset.

2. The method of claim 1, wherein the determining a transmit beamforming vector, for each BS associated with the wireless links of the selected subset, based on the channel estimation information comprises:
   determining a transmit beamforming vector for each BS associated with the wireless links of the selected subset, based on the channel estimation information to maximize a signal-to-interference-and-noise ratio (SINR) for the selected MS.

3. The method of claim 1, wherein the determining a transmit beamforming vector, for each BS associated with the wireless links of the selected subset, based on the channel estimation information comprises:
   determining a transmit beamforming vector for each BS associated with the wireless links of the selected subset, based on the channel estimation information to maximize a signal-to-leakage-and-noise ratio (SLNR) for each BS associated with wireless links of the selected subset.

4. The method of claim 1, wherein the determining a transmit beamforming vector, for each BS associated with the wireless links of the selected subset, based on the channel estimation information comprises:
   determining a transmit beamforming vector for each BS associated with the wireless links of the selected subset, based on the channel estimation information to minimize sum mean square error (MSE).

5. The method of claim 1, wherein the central controller is a base station of the plurality of base stations.

6. The method of claim 1, wherein the receiving, from the selected MS, channel estimation information for wireless links of a selected subset of the wireless links that meet one or more specified criteria comprises:
   measuring, by the selected MS, the link quality of the wireless link with each BS of the plurality of BSs;
   selecting, by the selected MS, a subset of the wireless links that includes wireless links that meet one or more specified criteria; and
   obtaining, by the selected MS, channel estimation information for the wireless links of the selected subset.

7. The method of claim 6, wherein the link quality of the wireless links is measured via handover (HO) measurement signaling.

8. The method of claim 6, wherein the link quality of the wireless links is measured via cell-specific reference signaling.

9. The method of claim 1, wherein the transmit beamforming vector is different for each BS associated with the wireless links of the selected subset.

10. The method of claim 1, wherein the providing the receive combining vector to each MS of each BS associated with the wireless links of the selected subset comprises:
transmitting the receive combining vector to each BS associated with the wireless links of the selected subset;
wherein each BS transmits the receive combining vector to the MS served by the BS.

11. The method of claim 1, wherein the providing the receive combining vector to each MS of each BS associated with the wireless links of the selected subset comprises:
transmitting the receive combining vector to each MS of each BS associated with the wireless links of the selected subset.

12. The method of claim 1, wherein the receive combining vector is different for each MS of each BS associated with the wireless links of the selected subset.

13. The method of claim 1, the method further comprising:
providing a pilot for determining the receive combining vector to each MS of each BS associated with the wireless links of the selected subset.

14. The method of claim 1, wherein the one or more specified criteria is based on at least one of a signal-to-noise ratio, a target signal-to-interference-and-noise ratio, and a number of cooperating BSs.

15. An apparatus for coordinated beamforming at a central controller in a network having a plurality of mobile stations and a plurality of base stations, the apparatus comprising:
means for requesting a selected mobile station (MS) to measure a link quality of a wireless link between the selected MS and each base station (BS) of the plurality of BSs;
means for receiving, from the selected MS, channel estimation information for wireless links of a selected subset of the wireless links that meet one or more specified criteria;
means for determining, by the central controller, a transmit beamforming vector, for each BS associated with the wireless links of the selected subset, based on the channel estimation information; and
means for transmitting the transmit beamforming vector to each BS associated with the wireless links of the selected subset.

16. An apparatus for coordinated beamforming at a central controller in a network having a plurality of mobile stations and a plurality of base stations, the apparatus comprising:
a transceiver;
a processor of the central controller configured for:
requesting, a selected mobile station (MS) to measure a link quality of a wireless link between the selected MS and each base station (BS) of the plurality of BSs;
receiving, from the selected MS, channel estimation information via the transceiver for wireless links of a selected subset of the wireless links that meet one or more specified criteria;
determining a transmit beamforming vector, for each BS associated with the wireless links of the selected subset, based on the channel estimation information; and
transmitting, via the transceiver, the transmit beamforming vector to each BS associated with the wireless links of the selected subset.

17. A computer program product for coordinated beamforming at a central controller in a network having a plurality of mobile stations and a plurality of base stations, the computer program product comprising:
a non-transitory computer-readable medium comprising code for:
requesting a selected mobile station (MS) to measure a link quality of a wireless link between the selected MS and each base station (BS) of the plurality of BSs;
receiving, from the selected MS, channel estimation information for wireless links of a selected subset of the wireless links that meet one or more specified criteria;
determining, at the central controller, a transmit beamforming vector, for each BS associated with the wireless links of the selected subset, based on the channel estimation information; and
transmitting the transmit beamforming vector to each BS associated with the wireless links of the selected subset.

18. A method of coordinated beamforming in a network having a plurality of mobile stations and a plurality of base stations, the method comprising:
requesting, by a selected base station (BS) of the plurality of BSs, a selected mobile station (MS) of the plurality of MSs to measure a link quality of a wireless link between the selected MS and each BS of the plurality of BSs;
receiving, from the selected MS, channel estimation information for wireless links of a selected subset of the wireless links that meet one or more specified criteria, the selected subset corresponding to BSs interfering with the selected MS;
determining, by the selected BS, a transmit beamforming vector for each of the interfering BSs and a receive combining vector for each of the wireless links of the selected subset, based on the channel estimation information;
providing, by the selected BS, the receive combining vector to each MS of each BS associated with the wireless links of the selected subset; and
transmitting the transmit beamforming vector to each of the interfering BSs.

19. The method of claim 18, wherein the receiving, from the selected MS, channel estimation information for wireless links of a selected subset of the wireless links that meet one or more specified criteria comprises:
measuring, by the selected MS, the link quality of the wireless link with each BS of the plurality of BSs;
selecting, by the selected MS, a subset of the wireless links that includes wireless links that meet one or more specified criteria; and
obtaining, by the selected MS, channel estimation information for the wireless links of the selected subset.

20. The method of claim 19, wherein the link quality of the wireless links is measured via handover (HO) measurement signaling.

21. The method of claim 19, wherein the link quality of the wireless links is measured via cell-specific reference signaling.

22. The method of claim 18, wherein the providing the receive combining vector to each MS of each BS associated with the wireless links of the selected subset comprises:
transmitting the receive combining vector to each BS associated with the wireless links of the selected subset;
wherein each BS transmits the receive combining vector to the MS served by the BS.

23. The method of claim 18, wherein the providing the receive combining vector to each MS of each BS associated with the wireless links of the selected subset comprises:
transmitting the receive combining vector to each MS of each BS associated with the wireless links of the selected subset.

24. The method of claim 18, the method further comprising:
providing a pilot for determining the receive combining vector to each MS of each BS associated with the wireless links of the selected subset.

25. The method of claim 18, wherein the one or more specified criteria is based on at least one of a signal-to-noise ratio, a target signal-to-interference-and-noise ratio, and a number of cooperating BSs.

26. The method of claim 18, the method further comprising:
receiving an updated transmit beamforming vector from one or more of the interfering BSs.

27. The method of claim 26, the method further comprising:
determining a new transmit beamforming vector, for each of the one or more of the interfering BSs, based on the updated transmit beamforming vector; and
transmitting the new transmit beamforming vector to each of the one or more of the interfering BSs.

28. The method of claim 18, wherein the transmit beamforming vectors for the BSs are determined asynchronously.

29. An apparatus for coordinated beamforming in a network having a plurality of mobile stations and a plurality of base stations, the apparatus comprising:
means for requesting, by a selected base station (BS) of the plurality of BSs, a selected mobile station (MS) of the plurality of MSs to measure a link quality of a wireless link between the selected MS and each BS of the plurality of BSs;
means for receiving, from the selected MS, channel estimation information for wireless links of a selected subset of the wireless links that meet one or more specified criteria, the selected subset corresponding to BSs interfering with the selected MS;
means for determining, by the selected BS, a transmit beamforming vector, for each of the interfering BSs, based on the channel estimation information; and
means for transmitting the transmit beamforming vector to each of the interfering BSs.

30. An apparatus for coordinated beamforming in a network having a plurality of mobile stations and a plurality of base stations, the apparatus comprising:
a transceiver;
a processor of a selected base station (BS) configured for:
requesting a selected mobile station (MS) of the plurality of MSs to measure a link quality of a wireless link between the selected MS and each BS of the plurality of BSs;
receiving, from the selected MS, channel estimation information via the transceiver for wireless links of a selected subset of the wireless links that meet one or more specified criteria, the selected subset corresponding to BSs interfering with the selected MS;
determining a transmit beamforming vector, for each of the interfering BSs, based on the channel estimation information; and
transmitting, via the transceiver, the transmit beamforming vector to each of the interfering BSs.

31. A computer program product for coordinated beamforming in a network having a plurality of mobile stations and a plurality of base stations, the computer program product comprising:
a non-transitory computer-readable medium comprising code for:
requesting, by a selected base station (BS) of the plurality of BSs, a selected mobile station (MS) of the plurality of MSs to measure a link quality of a wireless link between the selected MS and each BS of the plurality of BSs;
receiving, from the selected MS, channel estimation information for wireless links of a selected subset of the wireless links that meet one or more specified criteria, the selected subset corresponding to BSs interfering with the selected MS;
determining, by the selected BS, a transmit beamforming vector for each of the interfering BSs and a receive combining vector for each of the wireless links of the selected subset, based on the channel estimation information;
providing, by the central controller, the receive combining vector to each MS of each BS associated with the wireless links of the selected subset; and
transmitting the transmit beamforming vector to each of the interfering BSs.

32. The method of claim 1, further comprising determining, by the central controller, an initial transmit beamforming vector for each of the plurality of BSs.

33. The method of claim 32, wherein the channel estimation information is determined using the initial transmit beamforming vector.

34. The method of claim 32, wherein the initial transmit beamforming vector is determined based on a signal-to-leakage-and-noise ratio (SLNR).

35. The method of claim 1, wherein:
the transmit beamforming vector is determined by the central controller for each BS of the plurality of BSs using the channel estimation information received from the MS; and
the plurality of BS is separate from the central controller.

36. The method of claim 1, wherein the transmit beamforming vector is determined by the central controller based on a type of performance metric used, the types of performance metrics comprising one or more of maximizing a signal-to-interference-and-noise ratio (SINR) for the selected MS, maximizing a signal-to-leakage-and-noise ratio (SLNR) for each BS associated with wireless links of the selected subset, or minimizing a sum mean square error (MSE).

37. The method of claim 1, wherein determining, by the central controller, the transmit beamforming vector comprises computing the transmit beamforming vector at the central controller.

* * * * *